(12) United States Patent
Katayama et al.

(10) Patent No.: US 11,180,139 B2
(45) Date of Patent: Nov. 23, 2021

(54) DRIVING SUPPORT DEVICE AND DRIVING SUPPORT METHOD

(71) Applicant: HONDA MOTOR CO., LTD., Tokyo (JP)

(72) Inventors: Makoto Katayama, Wako (JP); Hiroyuki Yamada, Wako (JP); Idhsada Sanguanwongthong, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 150 days.

(21) Appl. No.: 16/116,993

(22) Filed: Aug. 30, 2018

(65) Prior Publication Data

US 2019/0071081 A1 Mar. 7, 2019

(30) Foreign Application Priority Data

Sep. 6, 2017 (JP) .............................. JP2017-171604

(51) Int. Cl.
*B60W 30/12* (2020.01)
*B60W 30/09* (2012.01)
(Continued)

(52) U.S. Cl.
CPC ............. *B60W 30/12* (2013.01); *B60Q 9/008* (2013.01); *B60W 30/09* (2013.01);
(Continued)

(58) Field of Classification Search
CPC .. B60W 30/12; B60W 30/09; B60W 2552/00; B60W 2554/80; B60W 2510/30;
(Continued)

(56) References Cited

U.S. PATENT DOCUMENTS

2003/0229447 A1* 12/2003 Wheatley ............. B62D 15/029
701/300
2009/0243822 A1* 10/2009 Hinninger ............. B60Q 9/008
340/435
(Continued)

FOREIGN PATENT DOCUMENTS

CN 105329166 2/2016
CN 106080386 11/2016
(Continued)

OTHER PUBLICATIONS

Japanese Office Action for Japanese Patent Application No. 2017-171604 dated Jul. 9, 2019.
(Continued)

*Primary Examiner* — Navid Ziaeianmehdizadeh
(74) *Attorney, Agent, or Firm* — Amin, Turocy & Watson, LLP

(57) ABSTRACT

A driving support device includes an output unit configured to output information, a recognition unit configured to recognize surrounding vehicles existing around a subject vehicle, and a control unit configured to determine control modes of in-vehicle devices of the subject vehicle on the basis of a position of a surrounding vehicle existing on an adjacent lane adjacent to a subject lane on which the subject vehicle exists among one or more surrounding vehicles recognized by the recognition unit.

6 Claims, 16 Drawing Sheets

(51) Int. Cl.
  *B60Q 9/00*   (2006.01)
  *B62D 15/02*  (2006.01)
(52) U.S. Cl.
  CPC ....... *B62D 15/025* (2013.01); *B62D 15/0265*
    (2013.01); *B60W 2510/30* (2013.01); *B60W*
    *2552/00* (2020.02); *B60W 2554/80* (2020.02);
    *B60W 2710/20* (2013.01)
(58) Field of Classification Search
  CPC . B60W 2710/20; B60Q 9/008; B62D 15/025;
    B62D 15/0265
  See application file for complete search history.

(56) References Cited

U.S. PATENT DOCUMENTS

| | | | | |
|---|---|---|---|---|
| 2014/0195141 | A1* | 7/2014 | Nagata | B60W 30/09 |
| | | | | 701/301 |
| 2015/0109131 | A1* | 4/2015 | Lindberg | G08B 21/06 |
| | | | | 340/576 |
| 2015/0314783 | A1* | 11/2015 | Nespolo | B60W 30/0953 |
| | | | | 701/301 |
| 2016/0214647 | A1* | 7/2016 | Weisswange | G06K 9/00791 |
| 2016/0339959 | A1* | 11/2016 | Lee | G06K 9/00805 |
| 2016/0355178 | A1* | 12/2016 | Shiraishi | G05D 1/0088 |
| 2017/0305418 | A1* | 10/2017 | Bae | B60W 50/0098 |
| 2018/0068191 | A1* | 3/2018 | Biemer | G06K 9/00825 |
| 2018/0082589 | A1* | 3/2018 | Park | B60W 30/0956 |
| 2018/0201192 | A1* | 7/2018 | Ishida | B60Q 9/008 |
| 2018/0257646 | A1* | 9/2018 | Takeuchi | B60W 50/0097 |
| 2018/0293894 | A1* | 10/2018 | Zhang | B60W 30/18163 |

FOREIGN PATENT DOCUMENTS

| | | |
|---|---|---|
| EP | 1918897 | 5/2008 |
| JP | 2009-184554 | 8/2009 |
| JP | 2009-539671 | 11/2009 |
| JP | 2009-539681 | 11/2009 |
| JP | 2010-115959 | 5/2010 |
| JP | 2010-125928 | 6/2010 |
| JP | 2013-054614 | 3/2013 |
| JP | 2013-242679 | 12/2013 |
| JP | 2016-081361 | 5/2016 |
| WO | 2007/145564 | 12/2007 |

OTHER PUBLICATIONS

Chinese Office Action for Chinese Patent Application No. 201810984382.4 dated Jul. 5, 2021.

* cited by examiner

DRIVING SUPPORT DEVICE AND DRIVING SUPPORT METHOD

CROSS-REFERENCE TO RELATED APPLICATIONS

This application is based upon and claims the benefit of priority from Japanese Patent Application No. 2017-171604, filed Sep. 6, 2017, the entire content of which are incorporated herein by reference.

BACKGROUND

Field of the Invention

The present invention relates to a driving support device and a driving support method.

Description of Related Art

Conventionally, when there is a possibility that a subject vehicle is going to collide with a vehicle existing on an adjacent lane adjacent to a subject lane, if a steering wheel rotates in accordance with an operation of a driver, a technology of applying torque in an opposite direction to a rotation direction of the shaft of this steering wheel is known (for example, refer to Japanese Unexamined Patent Application, First Publication No. 2009-539681).

In addition, a technology of outputting an alarm for causing the driver to notice that there is a risk of colliding with a vehicle on the adjacent lane if the turn signal operates when a vehicle exists on the adjacent lane, and outputting an alarm for alerting the driver's attention if the turn signal does not operate when a vehicle exists on the adjacent lane is known (for example, refer to Japanese Unexamined Patent Application, First Publication No. 2013-242679).

SUMMARY

However, in the conventional technologies, even if a vehicle on an adjacent lane exists at a position visible from the driver of a subject vehicle, excessive vehicle control may be performed on this vehicle in some cases. In this manner, the control of in-vehicle devices mounted on the subject vehicle has not been properly performed in consideration of a visibility state of the driver with respect to the vehicle on an adjacent lane.

Aspects of the present invention have been made in view of such circumstances, and an object thereof is to provide a driving support device and a driving support method which can perform control on in-vehicle devices in a more appropriate mode.

The driving support device and the driving support method according to the present invention have adopted the following configuration.

(1) According to one aspect of the present invention, a driving support device includes an output unit configured to output information, a recognition unit configured to recognize surrounding vehicles existing around a subject vehicle, and a control unit configured to determine control modes of in-vehicle devices of the subject vehicle on the basis of a position of a surrounding vehicle existing on an adjacent lane adjacent to a subject lane on which the subject vehicle exists among one or more surrounding vehicles recognized by the recognition unit.

(2) In the driving support device according to the aspect of (1), the control unit acquires information indicating an operation state of a direction indicator, causes the output unit to output the information regardless of the operation state of the direction indicator when a surrounding vehicle existing on the adjacent lane is in a first positional relationship of being positioned on a rear side of the subject vehicle, and causes the output unit to output information when a surrounding vehicle existing on the adjacent lane is in a second positional relationship of being positioned on a side of the subject vehicle and the direction indicator operates.

(3) In the driving support device according to the aspect of (2), the control unit causes the output unit to output first information that prompts a driver of the subject vehicle to pay attention when a surrounding vehicle existing on the adjacent lane is in the first positional relationship with respect to the subject vehicle, and causes the output unit to output second information that prompts the driver to pay more attention than the first information when a surrounding vehicle existing on the adjacent lane is in the second positional relationship with respect to the subject vehicle and the direction indicator operates.

(4) In the driving support device according to one aspect of (1) to (3), the recognition unit further recognizes a lane marking which partitions between the subject lane and the adjacent lane, and the control unit causes the output unit to output information regardless of a distance between a lane marking and the subject vehicle which is recognized by the recognition unit when a surrounding vehicle existing on the adjacent lane is in a first positional relationship of being positioned on the rear side of the subject vehicle, and causes the output unit to output information when a surrounding vehicle existing on the adjacent lane is in a second positional relationship of being positioned on the side of the subject vehicle and the distance between a lane marking and the subject vehicle which is recognized by the recognition unit is equal to or less than a predetermined distance.

(5) In the driving support device according to the aspect of (4), the control unit causes the output unit to output first information that prompts a driver of the subject vehicle to pay attention when a surrounding vehicle existing on the adjacent lane is in the first positional relationship with respect to the subject vehicle, and causes the output unit to output second information that prompts the driver to pay more attention than the first information when a surrounding vehicle existing on the adjacent lane is in the second positional relationship with respect to the subject vehicle and the distance between the lane marking and the subject vehicle is equal to or less than a predetermined distance.

(6) In the driving support device according to one aspect of (1) to (5), the recognition unit further recognizes a lane marking which partitions between the subject lane and the adjacent lane, and the control unit further acquires information indicating an operation state of a direction indicator, causes the output unit to output first information regardless of the operation state of the direction indicator and the distance between a lane marking and the subject vehicle which is recognized by the recognition unit when a surrounding vehicle existing on the adjacent lane is in a first positional relationship of being positioned on the rear side of the subject vehicle, causes the output unit to output second information when the direction indicator operates, causes the output unit to output third information when the distance between a lane marking and the subject vehicle which is recognized by the recognition unit is equal to or less than a first predetermined distance, and, when the distance between a lane marking and the subject vehicle which is recognized by the recognition unit is equal to or less than a second predetermined distance shorter than the first predetermined distance, controls steering of the subject vehicle such that the subject vehicle is kept away from the lane marking.

(7) In the driving support device according to one aspect of (1) to (6), the recognition unit further recognizes a lane marking which partitions between the subject lane and the adjacent lane, and the control unit further acquires information indicating an operation state of a direction indicator, causes the output unit to output first information regardless of the operation state of the direction indicator and the distance between a lane marking and the subject vehicle which is recognized by the recognition unit when a surrounding vehicle existing on the adjacent lane is in a first positional relationship of being positioned on the rear side of the subject vehicle, causes the output unit to output second information if the direction indicator operates, causes the output unit to output third information if the distance between a lane marking and the subject vehicle which is recognized by the recognition unit is equal to or less than a predetermined distance, and controls steering of the subject vehicle such that the subject vehicle is kept away from the lane marking if a predetermined time has elapsed since the output unit is caused to output the third information.

(8) According to another aspect of the present invention, a driving support method includes, by an in-vehicle computer mounted on a subject vehicle including an output unit which output information to a driver of the subject vehicle, recognizing surrounding vehicles existing around the subject vehicle, and determining control modes of in-vehicle devices of the subject vehicle on the basis of a position of a surrounding vehicle existing on an adjacent lane adjacent to a subject lane on which the subject vehicle exists among the recognized surrounding vehicles.

According to the aspects of (1) to (8), it is possible to control in-vehicle devices in a more appropriate manner.

DESCRIPTION OF EMBODIMENTS

Hereinafter, embodiments of a driving support device and a driving support method of the present invention will be described with reference to drawings.

First Embodiment

[Overall Configuration]

Figure 1:
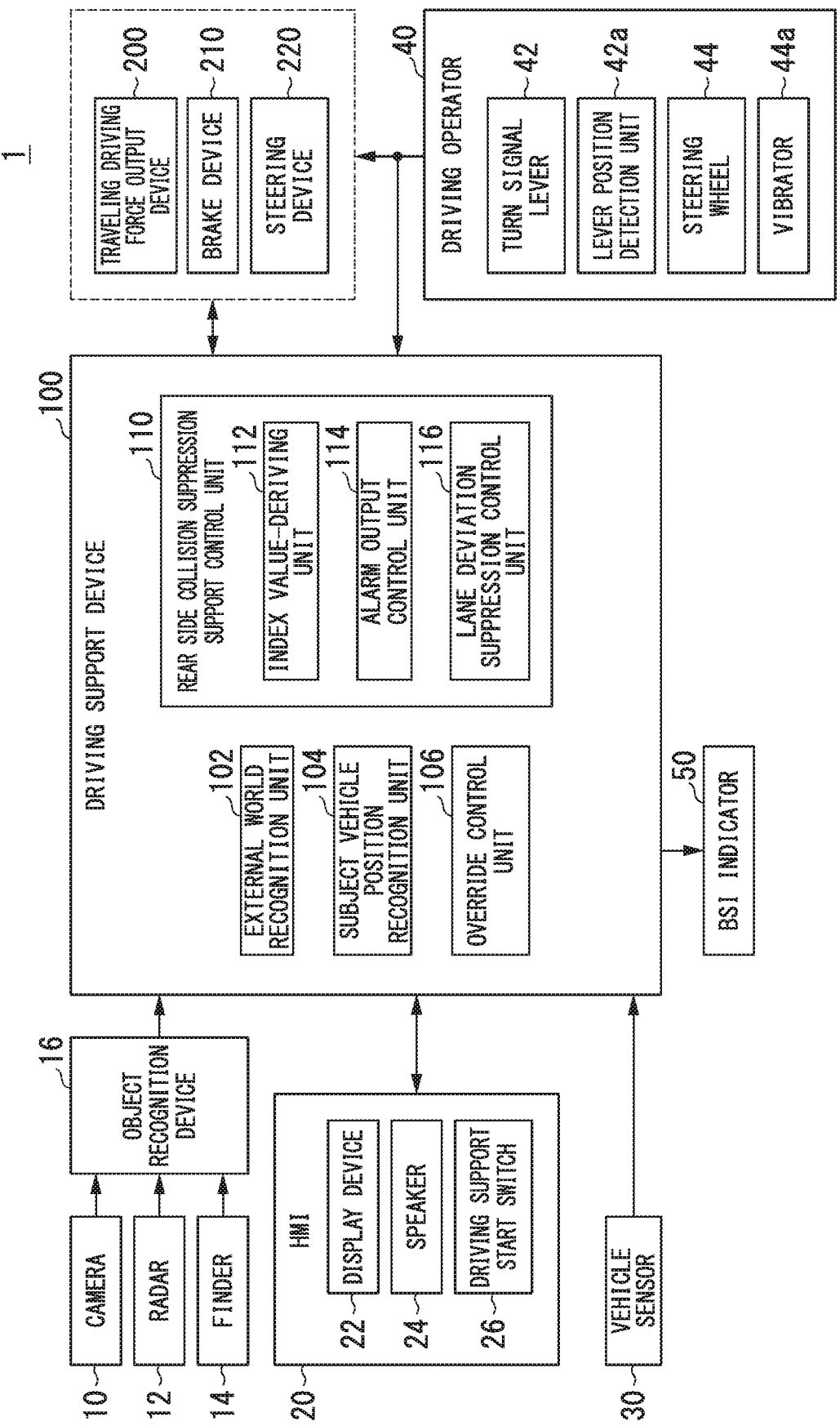
FIG. 1 is a configuration diagram of a vehicle control system including a driving support device of a first embodiment.

FIG. 1 is a configuration diagram of a vehicle control system 1 including a driving support device of a first embodiment. A vehicle on which a vehicle control system 1 is mounted (hereinafter, referred to as a subject vehicle) is, for example, a two-wheeled vehicle, a three-wheeled vehicle, a four-wheeled vehicle, or the like, and a driving source thereof is an internal combustion engine such as a diesel engine or a gasoline engine, an electric motor, or a combination of these. The electric motor operates using electric power generated by a generator connected to the internal combustion engine, or discharged electric power of a secondary battery or a fuel cell battery.

The vehicle control system 1 includes, for example, a camera 10, a radar 12, a finder 14, an object recognition device 16, a human machine interface (HMI) 20, a vehicle sensor 30, a driving operator 40, a blind spot information (BSI) indicator 50, a driving support device 100, a traveling driving force output device 200, a brake device 210, and a steering device 220. These devices or apparatuses are connected to each other by a multiplex communication line such as a controller area network (CAN) communication line, a serial communication line, a wireless communication network, or the like. The configuration shown in FIG. 1 is merely an example, and a part of the configuration may be omitted, or another configuration may also be further added. A configuration of the driving support device 100 may include other constituents other than devices such as the object recognition device 16, the driving operator 40, and the BSI indicator 50.

The camera 10 is, for example, a digital camera using a solid-state imaging device such as a charge-coupled device (CCD) or a complementary metal oxide semiconductor (CMOS). One or more cameras 10 are attached to an arbitrary place of the subject vehicle M. In a case of imaging the front, the camera 10 is attached to a top of a front windshield or a rear surface of a rear-view mirror. The camera 10, for example, periodically repeats imaging of a periphery of the subject vehicle M. The camera 10 may also be a stereo camera.

The radar 12 radiates radio waves such as millimeter waves around the subject vehicle M, and detects at least a position (a distance and an orientation) of an object by detecting radio waves (reflected waves) reflected by the object. For example, the radar 12 is installed in individual places such as a front grill, a front bumper, a door mirror, the inside of a headlight, the vicinity of a side light on a front end side of the vehicle, a trunk lid, the inside of a tail light, and the vicinity of a side light on a rear end side of the vehicle such that an entire periphery of the subject vehicle M is a detection area. The radar 12 may also detect a position and a speed of an object in a frequency-modulated continuous wave (FM-CW) method.

The finder 14 is a light detection and ranging or laser imaging detection and ranging (LIDAR) which measures scattered light with respect to irradiated light, and detects a distance to an object. For example, the finder 14 is installed in individual places such as the front grill, the front bumper, the door mirror, the inside of a headlight, the vicinity of a side light on the front end side of the vehicle, the trunk lid, the inside of a tail light, the vicinity of a side light on the rear end side of the vehicle, a bonnet, and a roof such that the entire periphery of the subject vehicle M is a detection area.

The object recognition device 16 recognizes the position, type, speed, moving direction, and the like of an object by performing a sensor fusion process on a detection result of some or all of the camera 10, the radar 12, and the finder 14. The recognized object is, for example, an object of a type such as a vehicle, a guiderail, a utility pole, a pedestrian, or a road sign. The object recognition device 16 outputs a recognition result to the driving support device 100. The object recognition device 16 may also output some of information input from the camera 10, the radar 12, or the finder 14 to the driving support device 100 as it is.

The HMI 20 presents various types of information to a driver of the subject vehicle M and receives an operation input by the driver. The HMI 20 includes, for example, a display device 22, a speaker 24, a driving support start switch 26, and the like. Respective devices included in the HMI 20 are, for example, attached to arbitrary places such as each unit of an instrument panel, each of a driver's seat, a passenger's seat, a rear seat, and the like, and a door of a vehicle.

The display device 22 is, for example, a liquid crystal display (LCD) or an organic electroluminescence (EL) display. The display device 22 may also be a touch panel integrated with a touch pad.

The speaker 24 is installed, for example, on a left front end side, a right front end side, a left rear end side, a right rear end side, and the like of the subject vehicle M.

The driving support start switch 26 is a switch for causing the driving support device 100 to start driving support control. The driving support control is, for example, a control mode in which the traveling driving force output device 200 and one or both of the brake device 210, and the steering device 220 are controlled. On the other hand, when the driving support start switch 26 is not operated, that is, when the driving support device 100 does not execute the driving support control, manual driving is performed. In the manual driving, the traveling driving force output device 200, the brake device 210, and the steering device 220 are controlled in accordance with an operation of the driving operator 40 of a driver which is mounted on the subject vehicle M (in accordance with an operation amount of the driving operator 40).

The vehicle sensor 30 includes, for example, a vehicle speed sensor which detects a speed of the subject vehicle M, an acceleration sensor which detects acceleration, a yaw-rate sensor which detects an angular speed around a vertical axis, a direction sensor which detects a direction of the subject vehicle M, and the like. Each sensor included in the vehicle sensor 30 outputs a detection signal indicating a result of detection to the driving support device 100.

The driving operator 40 includes, for example, various types of operators such as a turn signal lever (a direction instruction switch) 42 for switching between operation and stopping of a turn signal (a direction indicator), a steering wheel 44, an accelerator pedal, a brake pedal, and a shift lever. For example, a detection unit which detects an operation amount of an operation executed by a driver is attached to each operator of the driving operator 40. For example, a lever position detection unit (lever position detector) 42a is provided in the turn signal lever 42. The lever position detection unit 42a detects a position of the turn signal lever 40a. A detection unit provided in the accelerator pedal or the brake pedal detects a depression amount of a corresponding pedal, and a detection unit provided in the steering wheel 44 detects a steering angle, steering torque, and the like of the steering wheel 44. Then, each detection unit (the lever position detection unit 42a is also included) outputs a detection signal indicating a result of detection to the driving support device 100 or one or both of the traveling driving force output device 200, the brake device 210, and the steering device 220.

A vibrator 44a is provided in the steering wheel 44. The vibrator 44a operates under control of the driving support device 100. The operating vibrator 44a causes the steering wheel 44 to vibrate.

The BSI indicator 50 displays, for example, a predetermined image 50a on a part of a mirror surface of a door mirror DMR. The predetermined image 50a is, for example, an image for notifying a driver that the subject vehicle M approaches a surrounding vehicle at the present time or approaches a surrounding vehicle at a certain future time, and prompting the driver to visually confirm the vehicles of the image.

Figure 2:
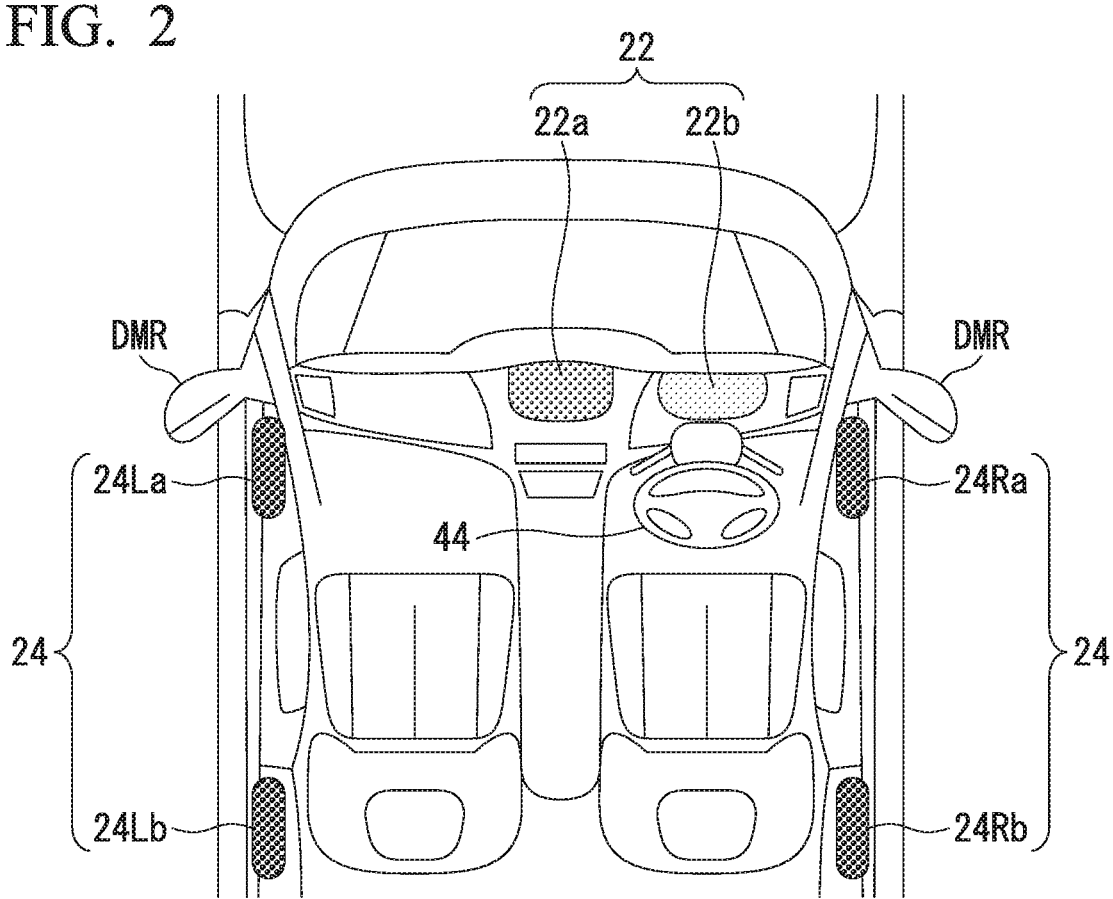
FIG. 2 is a diagram which shows an example of a vehicle compartment interior when a subject vehicle is viewed from the above.

FIG. 2 is a diagram which shows an example of a vehicle compartment interior when the subject vehicle M is viewed from the above. As illustrated, for example, the display device 22 is positioned under a front windshield, and is installed in a dashboard provided in front of the driver's seat and the passenger's seat (22a in FIG. 2). The display device 22 may be, for example, installed in front of the driver's seat (22b in FIG. 2), and function as an instrument panel which displays meters such as a speedometer and a tachometer. The speaker 24 is installed in, for example, the vicinity of a door closest to the passenger's seat (24La in FIG. 2), the vicinity of a door closest to the driver's seat (24Ra in FIG. 2), the vicinity of a door closest to a rear seat behind the passenger's seat (24Lb in FIG. 2), and the vicinity of a door closest to a rear seat behind the driver's seat (24Rb in FIG. 2).

Figure 3:
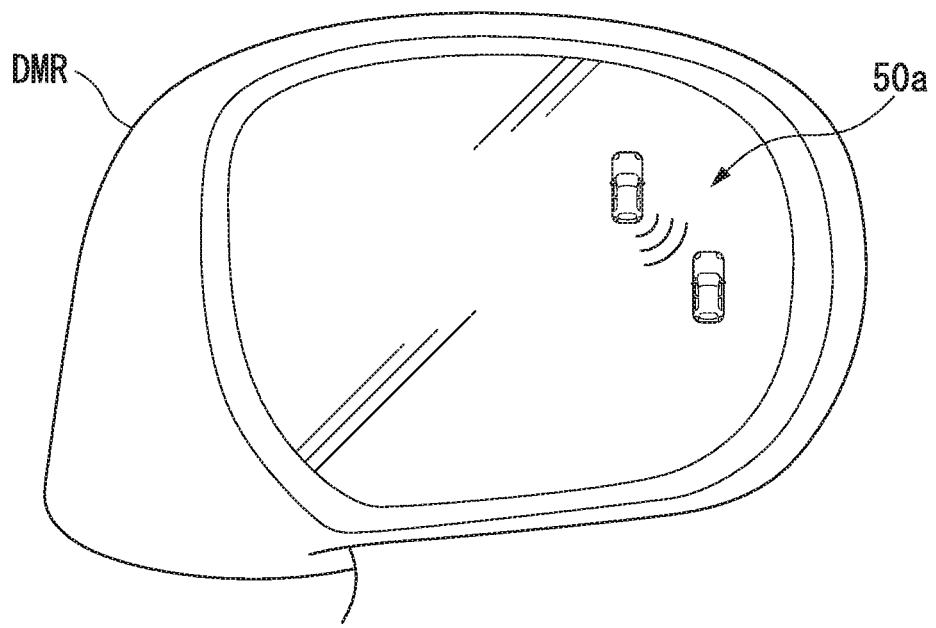
FIG. 3 is a diagram which shows an example of a door mirror.

FIG. 3 is a diagram which shows an example of the door mirror DMR. As shown in an illustrated example, the predetermined image 50a indicating that a surrounding vehicle approaches the subject vehicle M is displayed on a part of a mirror surface of the door mirror DMR.

Prior to description of the driving support device 100, the traveling driving force output device 200, the brake device 210, and the steering device 220 will be described. The traveling driving force output device 200 outputs a traveling driving force (torque) for driving the subject vehicle M to a driving wheel. The traveling driving force output device 200 includes, for example, a combination of an internal combustion engine, an electric motor, a transmission, and the like, and a power electronic control unit (ECU) which controls these. The power ECU controls the above constituents in accordance with information input from the driving support device 100 or information input from the driving operator 40.

The brake device 210 includes, for example, a brake caliper, a cylinder which transmits a hydraulic pressure to the brake caliper, an electric motor which generates a hydraulic pressure in a cylinder, and a brake ECU. The brake ECU controls an electric motor in accordance with the information input from the driving support device 100 or the information input from the driving operator 40 such that brake torque in accordance with the braking operation is output to each wheel. The brake device 210 may include a mechanism which transmits a hydraulic pressure generated by an operation of a brake pedal included in the driving operator 40 to the cylinder via a master cylinder as a backup. The brake device 210 is not limited to the configuration described above, and may be an electronically controlled type hydraulic pressure brake device which transmits a hydraulic pressure of the master cylinder to the cylinder by controlling an actuator in accordance with the information input from the driving support device 100.

The steering device 220 includes, for example, the steering ECU and the electric motor. The electric motor changes a direction of a steering wheel by, for example, applying a force to a rack and pinion mechanism. The steering ECU drives the electric motor and changes the direction of a steering wheel in accordance with the information input from the driving support device 100 or the information input from the driving operator 40.

[Configuration of Driving Support Device]

The driving support device 100 includes, for example, an external world recognition unit (external world recognizer) 102, a subject vehicle position recognition unit (subject vehicle position recognizer) 104, an override control unit (override controller) 106, and a rear side collision suppression support control unit (rear side collision suppression support controller) 110. The external world recognition unit 102 is an example of a "recognition unit" in the claims and the rear side collision suppression support control unit 110 is an example of a "control unit" in the claims.

Some or all of components of the driving support device 100 are, for example, realized by a hardware processor such as a central processing unit (CPU) executing a program (software). Some or all of these components may be realized by hardware (including circuitry) such as a large-scale integration (LSI), an application-specific integrated circuit (ASIC), a field-programmable gate array (FPGA), and a graphics-processing unit (GPU), and may also be realized by cooperation of software and hardware. These components may be realized by one processor, and may also be realized by a plurality of processors. In the latter case, for example, the driving support device 100 may be a system in which a plurality of electronic control units (ECUs) are combined.

The external world recognition unit 102 recognizes states of the position, speed, acceleration, and the like of a surrounding vehicle on the basis of information input from the camera 10, the radar 12, and the finder 14 via the object recognition device 16. The position of a surrounding vehicle may be represented using representative points such as a center of gravity, corners, and the like of the surrounding vehicle, and may also be represented using an area expressed by an outline of the surrounding vehicle. The "states" of the surrounding vehicle may include acceleration, a jerk, or a "behavior state" (for example, whether changing lanes is performed or whether changing lanes is intended) of the surrounding vehicle. The external world recognition unit 102 may recognize states of other types of objects such as guiderails, utility poles, parked vehicles, and pedestrians in addition to the surrounding vehicle.

The subject vehicle position recognition unit 104 recognizes, for example, a lane (a traveling lane) on which the subject vehicle M travels, and a relative position and a posture of the subject vehicle M with respect to the traveling lane. The subject vehicle position recognition unit 104, for example, recognizes lane markings LM of a road from an image captured by the camera 10, and recognizes a lane partitioned off by two lane markings LMs closest to the subject vehicle M among the recognized lane markings LMs as the traveling lane. Then, the subject vehicle position recognition unit 104 recognizes the position and posture of the subject vehicle M with respect to the recognized traveling lane.

Figure 4:
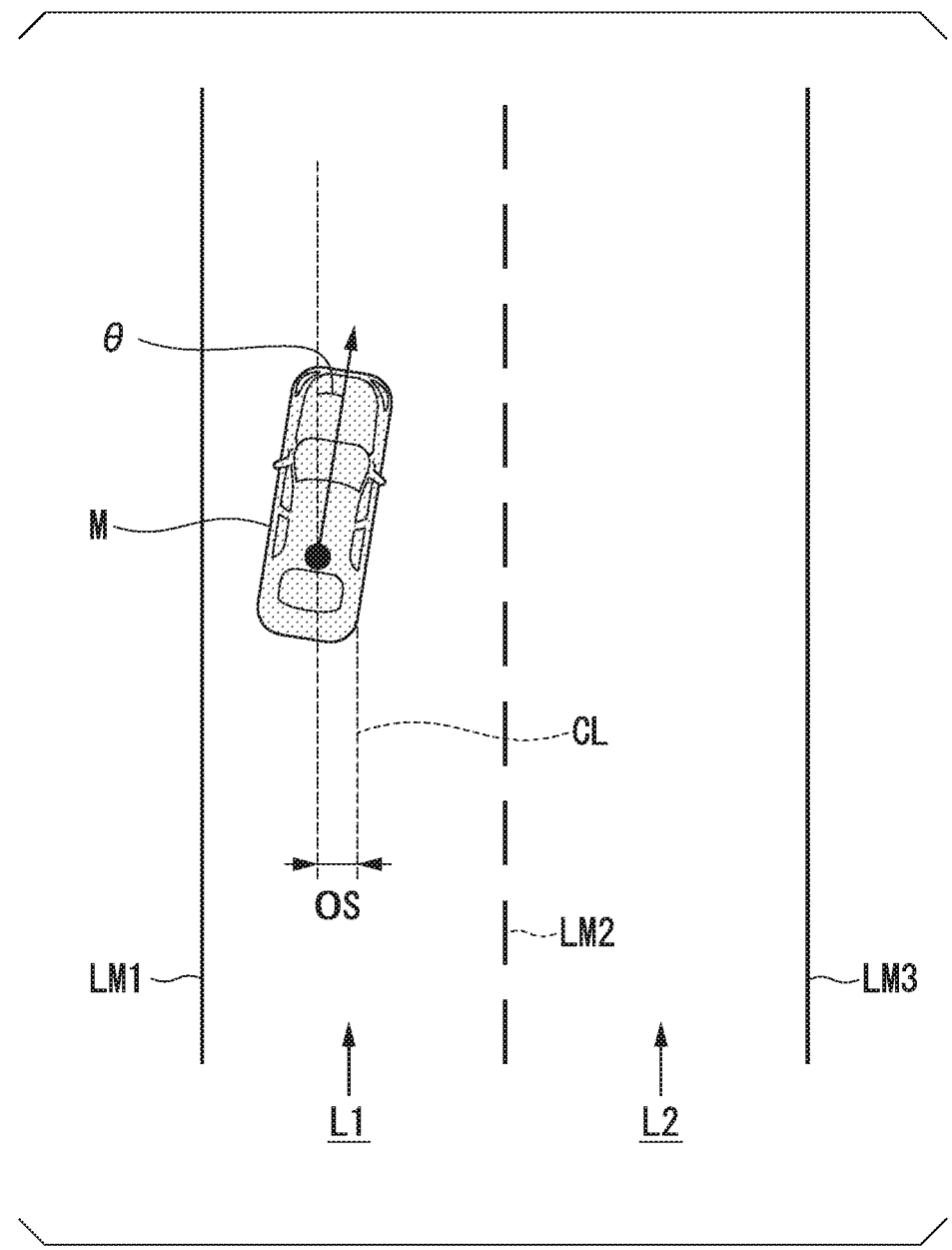
FIG. 4 is a diagram which shows how a relative position and posture of a subject vehicle with respect to a traveling lane are recognized by a subject vehicle position recognition unit.

FIG. 4 is a diagram which shows how the relative position and posture of the subject vehicle M with respect to a traveling lane L1 are recognized by the subject vehicle position recognition unit 104. The subject vehicle position recognition unit 104, for example, recognizes a LM3 from the lane marking LM1, and recognizes an area between the lane markings LM1 and LM2 closest to the subject vehicle M as the traveling lane L1 of the subject vehicle M. Then, the subject vehicle position recognition unit 104 recognizes a divergence OS of a reference point (for example, a center of gravity) of the subject vehicle M from a traveling lane center CL, and an angle $\theta$ formed with respect to a line aligned with the traveling lane center CL in a traveling direction of the subject vehicle M as the relative position and posture of the subject vehicle M with respect to the traveling lane L1. Instead of this, the subject vehicle position recognition unit 104 may also recognize a position and the like of the reference point of the subject vehicle M with respect to one of side end portions of the subject lane L1 as the relative position of the subject vehicle M with respect to the traveling lane.

The subject vehicle position recognition unit 104, for example, may recognize an adjacent lane adjacent to the subject lane. For example, the subject vehicle position recognition unit 104 recognizes an area between a lane marking closest to the subject vehicle M next to a lane marking of the subject lane and the lane marking of the subject lane as an adjacent lane. In the example of FIG. 4, for example, the subject vehicle position recognition unit 104 recognizes an area between a lane marking LM2 of the subject lane and a lane marking LM3 closest to the subject vehicle M next to the lane marking LM2 as a right adjacent lane L2.

The override control unit 106 determines whether an operation of instructing an override to the driving operator 40 has been performed. An override means that, when a driver operates the driving operator 40 such as the accelerator pedal, the brake pedal, or the steering wheel 44 using a certain level or higher of force (an operation amount), control by the rear side collision suppression support control unit 110 becomes invalid, and instead a driving operation of the driver becomes valid. That is, the override means that a right to control the subject vehicle M transits from a vehicle side to a driver side.

For example, the override control unit 106 determines that an operation on a brake pedal is an operation instructing an override when an operation amount of the brake pedal is larger than a predetermined operation amount. The override control unit 106 determines that an operation on an accelerator pedal is an operation instructing an override when an operation amount of the accelerator pedal is larger than a predetermined operation amount. The override control unit 106 determines that an operation on a steering wheel 44 is an operation instructing an override when an operation amount of the steering wheel 44 is larger than a predetermined operation amount.

When the override control unit 106 determines that an operation on the driving operator 40 is an operation instructing an override, the override control unit 106 stops the driving support control if the driving support control has already been executed by the rear side collision suppression support control unit 110. As a result, a control mode of the subject vehicle M is switched from the driving support control to the manual driving.

The rear side collision suppression support control unit 110 includes, for example, an index value-deriving unit (index value-deriver) 112, an alarm output control unit (alarm output controller) 114, and a lane deviation suppression control unit (lane deviation suppression controller) 116.

The index value-deriving unit 112 derives various index values referred to by the alarm output control unit 114 and the lane deviation suppression control unit 116. For example, the index value-deriving unit 112 derives the distance d between the lane marking of the subject lane and the subject vehicle M which is recognized by the subject vehicle position recognition unit 104. The index value-deriving unit 112 derives a speed (a lateral speed) v1 of the subject vehicle M in a vehicle width direction on the basis of a result of detection by the vehicle sensor 30. The index value-deriving unit 112 derives a relative distance x and a relative speed v2 between an adjacent vehicle existing in an adjacent lane among the surrounding vehicles recognized by the external world recognition unit 102 and the subject vehicle M.

In accordance with a position of a surrounding vehicle (hereinafter, referred to as an adjacent vehicle) existing on an adjacent lane adjacent to the subject lane, the alarm output control unit 114, as one of the driving support control, notifies the driver of the subject vehicle M that the subject vehicle M approaches the adjacent vehicle using an alarm. A specific example of an output mode for an alarm will be described below. A combination of the HMI 20, the steering wheel 44, the vibrator 44a, and the alarm output control unit 114 is an example of an "output unit".

For example, the alarm output control unit 114 determines whether an adjacent vehicle exists in a blind area as viewed from the driver of the subject vehicle M (hereinafter, a blind spot area) or an area further backward than the blind spot area (hereinafter, a rear area) on an adjacent lane on the basis of the relative distance x between the adjacent vehicle and the subject vehicle M which is derived by the index value-deriving unit 112, and causes the HMI 20 to output an alarm when it is determined that the adjacent vehicle exists in these areas.

Figure 5:
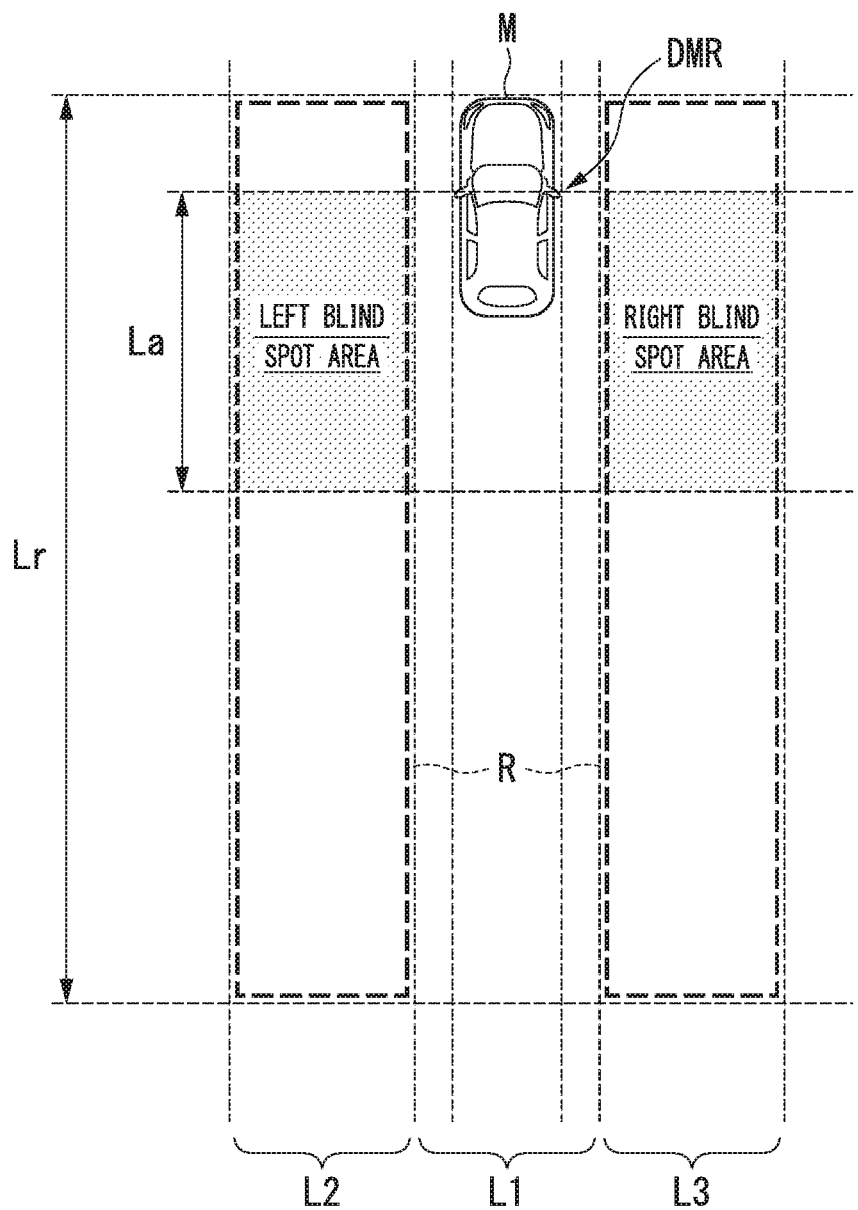
FIG. 5 is a diagram which shows an example of a blind spot area.

FIG. 5 is a diagram which shows an example of the blind spot area. L1 in FIG. 5 represents a subject lane, L2 represents an adjacent lane on a left side of the subject lane L1 in the traveling direction of the subject vehicle M, and L3 represents an adjacent lane on a right side of the subject lane L1 in the traveling direction of the subject vehicle M. An area indicated by R in FIG. 5 represents an area (hereinafter, a monitoring area) determined such that surrounding vehicles recognized in this area are treated as adjacent vehicles among one or a plurality of surrounding vehicles recognized by the external world recognition unit 102. The monitoring area R is set as an area, for example, from a front end of the subject vehicle M to a rear position that is a predetermined distance Lr apart on each adjacent lane. The blind spot area is set as an area, for example, from an installation position of the door mirror DMR of the subject vehicle M to a rear position that is a predetermined distance La apart in the monitoring area R.

Figure 6:
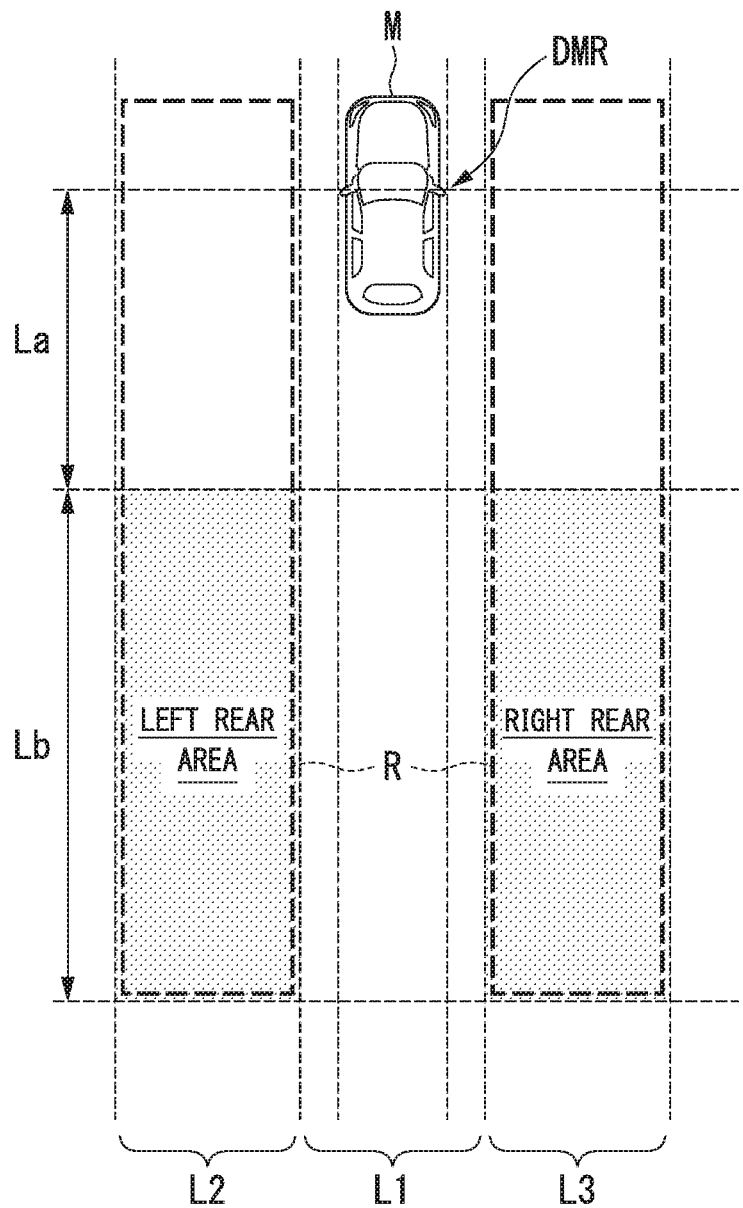
FIG. 6 is a diagram which shows an example of a rear area.

FIG. 6 is a diagram which shows an example of the rear area. As shown in the illustrated example, the rear area is set as an area, for example, from a rear end of the blind spot area to a rear position that is a predetermined distance Lb apart in the monitoring area R. When an adjacent vehicle exists in this blind spot area or rear area, the alarm output control unit 114 causes the HMI 20 to output an alarm. "Existence of an adjacent vehicle in the blind spot area or the rear area" means, for example, that a front end of the adjacent vehicle (for example, a front bumper, and the like) is included in this area as viewed from the above. The existence of the front end of the adjacent vehicle in the blind spot area or rear area of the subject vehicle M is an example of "a surrounding vehicle existing on an adjacent lane is in a first positional relationship of being positioned on the rear side of a subject vehicle."

In the monitoring area R, in addition to the blind spot area and the rear area which are areas in which an alarm is output as described above, an area in which an alarm is not output in principle even though an adjacent vehicle exists in this area is included. Hereinafter, the area in which an alarm is not output in principle will be described as a "side area."

Figure 7:
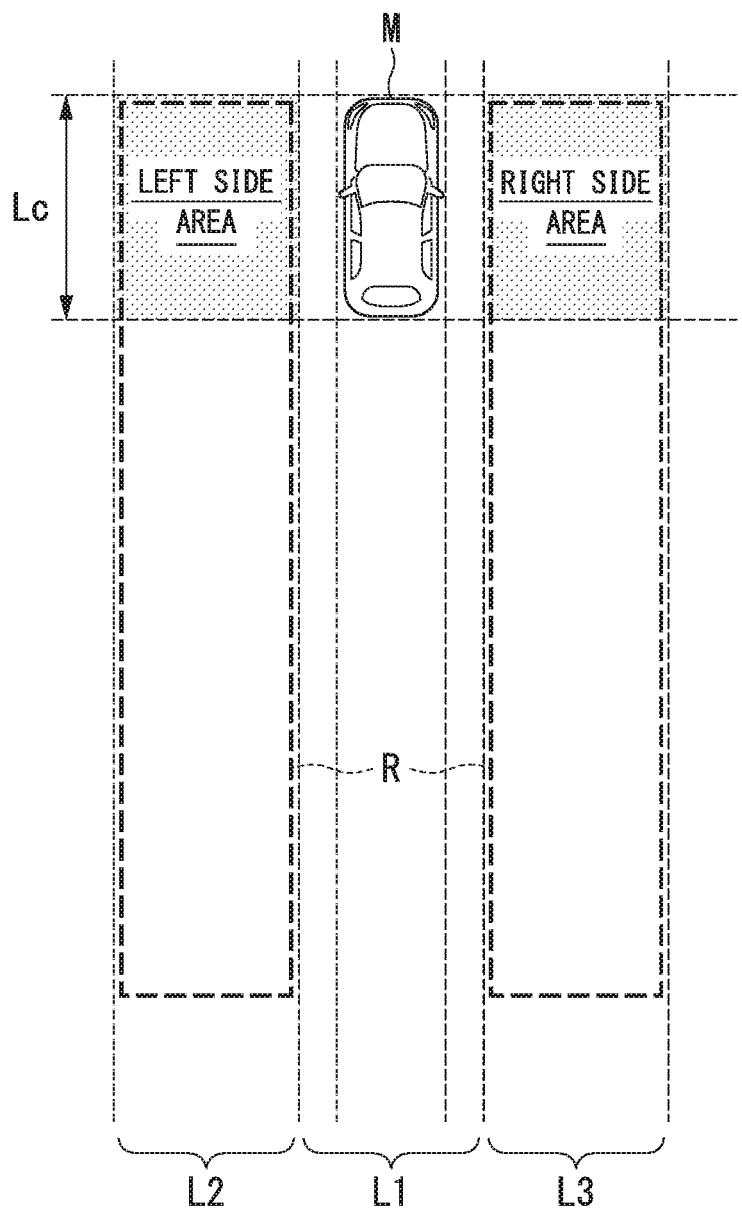
FIG. 7 is a diagram which shows an example of a side area.
Figure 8:
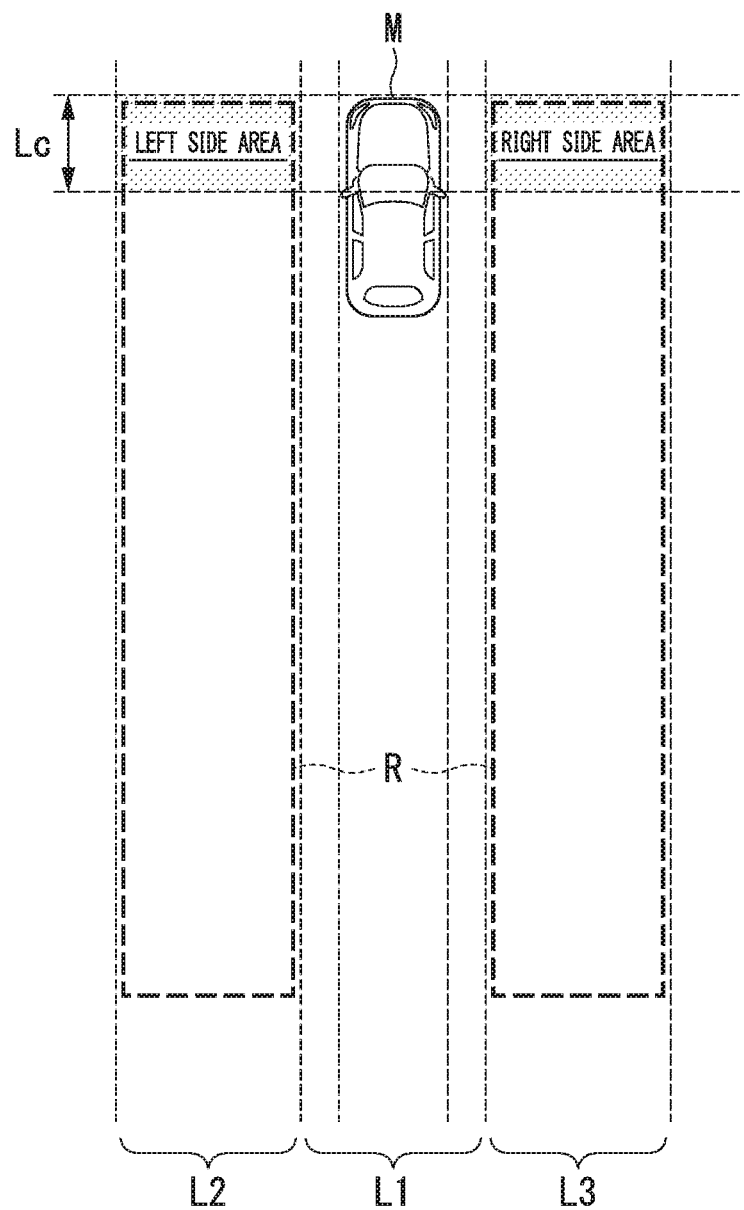
FIG. 8 is a diagram which shows another example of the side area.

FIG. 7 is a diagram which shows an example of the side area. FIG. 8 is a diagram which shows another example of the side area. As shown in the example of FIG. 7, for example, the side area is set as an area from the front end of the subject vehicle M to the rear end (a position that is a total length Lc of the subject vehicle M apart) in the monitoring area R. In this case, the side area is set to overlap the blind spot area. As shown in the example of FIG. 8, for example, the side area may also be set as an area excluding the blind spot area and the rear area in the monitoring area R. In this case, the three areas of the side area, the blind spot area, and the rear area are set not to overlap one another. When an adjacent vehicle exists on the side area, the alarm output control unit 114 does not cause the HMI 20 to output an alarm. "Existence of an adjacent vehicle in the side area" means, for example, that the rear end (for example, a rear bumper, and the like) of the adjacent vehicle is included in this area as viewed from the above. The existence of the rear end of the adjacent vehicle in the side area of the subject vehicle M is an example of "a surrounding vehicle existing on an adjacent lane is in a second positional relationship of being positioned on the side of a subject vehicle."

When an adjacent vehicle exists in the side area, the alarm output control unit 114 does not cause an alarm to be output in principle, but, when the turn signal operates, the alarm output control unit 114 may exceptionally cause an alarm to be output. For example, in a case in which an adjacent vehicle exists on a left-side adjacent lane, and this adjacent vehicle exists in the side area, when a turn signal on the left side of the subject vehicle M operates, the alarm output control unit 114 causes the HMI 20 to output an alarm. When an adjacent vehicle exists in the side area, the adjacent vehicle is highly likely to enter a view of the driver of the subject vehicle M, and thus it can be assumed that a lane change is attempted after the existence of the adjacent vehicle is noticed. However, since the adjacent vehicle can be an obstacle to the subject vehicle M at the time of changing a lane, the driver is notified that the adjacent vehicle exists on an adjacent lane which is a destination of a lane change using an alarm.

Regardless of the presence or absence of an operation of a turn signal, when the subject vehicle M has come close to (has approached) the adjacent lane on which the adjacent vehicle exists, the alarm output control unit 114 may cause the HMI 20 to output an alarm. For example, the alarm output control unit 114 causes the HMI 20 to output an alarm when the distance d between a lane marking and the subject vehicle M which is derived by the index value-deriving unit 112 is equal to or less than a first distance threshold value D1 or when an estimated lane deviation time t0 lane crossing (TTLC) which is a time until the subject vehicle M crosses over a lane marking is equal to or less than a first time threshold value TTLC1. The first distance threshold value D1 is a distance of a predetermined length taken in the vehicle width direction to a center side of a lane from a lane marking which partitions the subject lane. The estimated lane deviation time TTLC is, for example, derived as a value obtained by dividing the distance d by the lateral speed v1 of the subject vehicle M (d/v1).

Even if an adjacent vehicle exists in the side area or an area further forward than the side area, when the relative speed v2 between the adjacent vehicle and the subject vehicle M is larger than a predetermined speed (the speed of the adjacent vehicle is significantly greater than the speed of the subject vehicle M), the alarm output control unit 114 may treat the adjacent vehicle as a vehicle existing in an area after the side area.

The lane deviation suppression control unit 116 executes control to cause the subject vehicle M not to deviate from the traveling lane (hereinafter, lane deviation suppression control) as one type of the driving support control.

Figure 9:
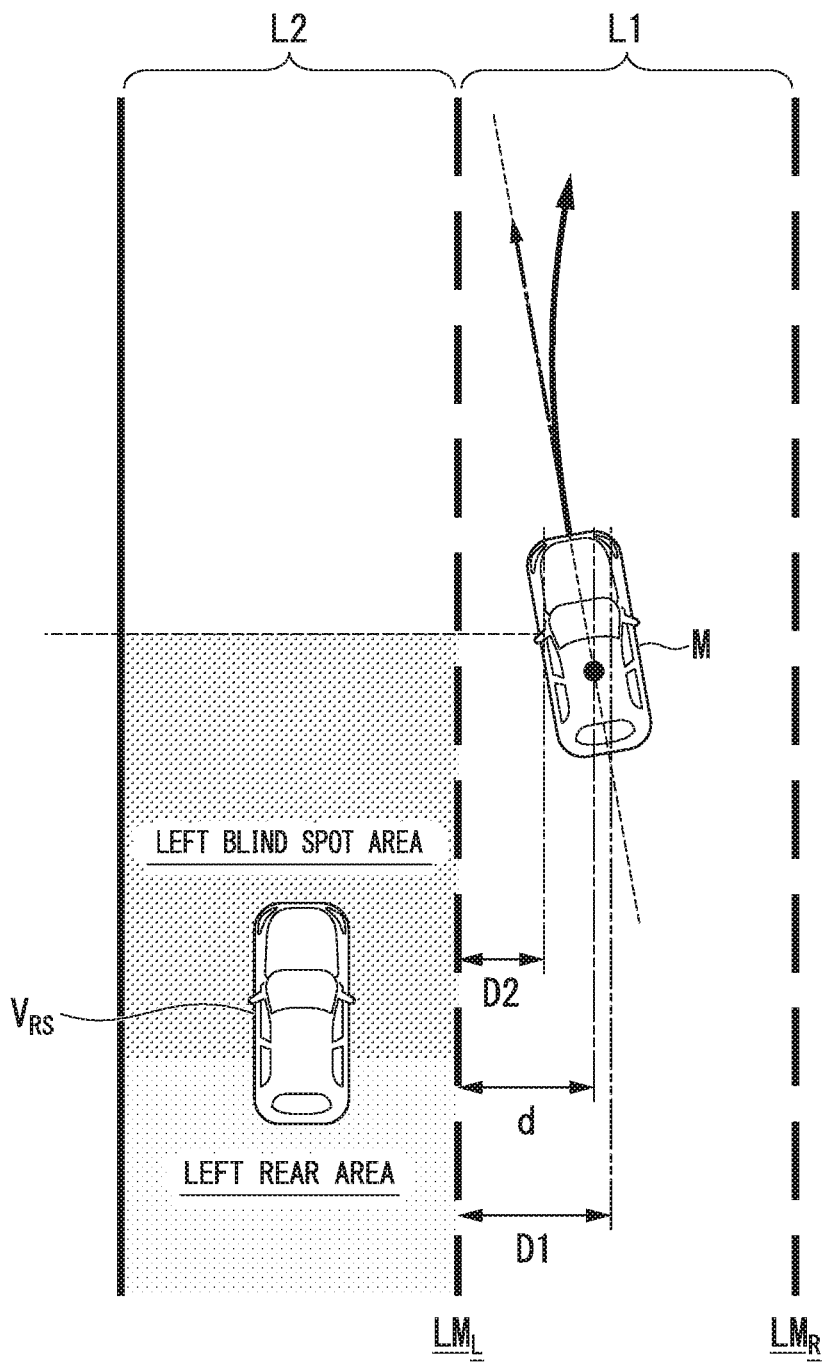
FIG. 9 is a diagram which shows an example of a scene in which lane deviation suppression control is executed.

FIG. 9 is a diagram which shows an example of a scene in which the lane deviation suppression control is executed. $LM_L$ in FIG. 9 represents a left-side lane marking in the traveling direction among two lane markings which partition the subject lane L1, and $LM_R$ represents a right-side lane marking in the traveling direction among the two lane markings which partition the subject lane L1. As shown in the illustrated example, an adjacent vehicle on a left-side adjacent lane L2 exists in the blind spot area. $V_{RS}$ in FIG. 9 represents the adjacent vehicle.

For example, the lane deviation suppression control unit 116 causes the vibrator 44a to operate such that the steering wheel 44 is vibrated as a pre-control before executing the lane deviation suppression control when the subject vehicle M has approached the lane marking $LM_L$ until the distance d between the lane marking $LM_L$ and the subject vehicle M is equal to or less than the first distance threshold value DE As a result, it is possible to prompt the driver to operate the steering wheel 44 such that the subject vehicle M travels at the center of the lane.

When there is no driver's operation for the steering wheel 44 (a steering angle or steering torque is less than a threshold value) after the steering wheel 44 is vibrated, and the subject vehicle M has further approached the lane marking $LM_L$ until the distance d between the lane marking $LM_L$ and the subject vehicle M is equal to or less than a second distance threshold value D2 which is smaller than the first distance threshold value D1, or when a predetermined time has elapsed since the steering wheel 44 is vibrated, the lane deviation suppression control unit 116 performs steering control such that the subject vehicle M returns to the center side of the lane as the lane deviation suppression control. The second distance threshold value D2, like the first distance threshold value D1, is a distance of a predetermined length taken in the vehicle width direction to the center side of a lane from a lane marking which partitions the subject lane. For example, when a center of gravity of the subject vehicle M has approached the lane marking until the distance d is equal to or less than the second distance threshold value D2 as viewed from the above, the second distance threshold value is set to the extent that a part of the body of the subject vehicle M crosses the lane marking.

The lane deviation suppression control unit 116 may perform the steering control such that the subject vehicle M returns to the center side of the lane as the lane deviation suppression control when the estimated lane deviation time TTLC obtained by dividing the distance d by the lateral speed v1 of the subject vehicle M (=d/v1) is equal to or less than the second time threshold value TTLC2. The second time threshold value TTLC2 is set to, for example, a time shorter than the first time threshold value TTLC1.

The lane deviation suppression control unit 116 may notify the driver that the subject vehicle M deviates from the subject lane by causing the display device 22 of the HMI 20 to display an image or causing the speaker 24 to output sound when the lane deviation suppression control unit 116 performs lane deviation suppression control.

Figure 10:
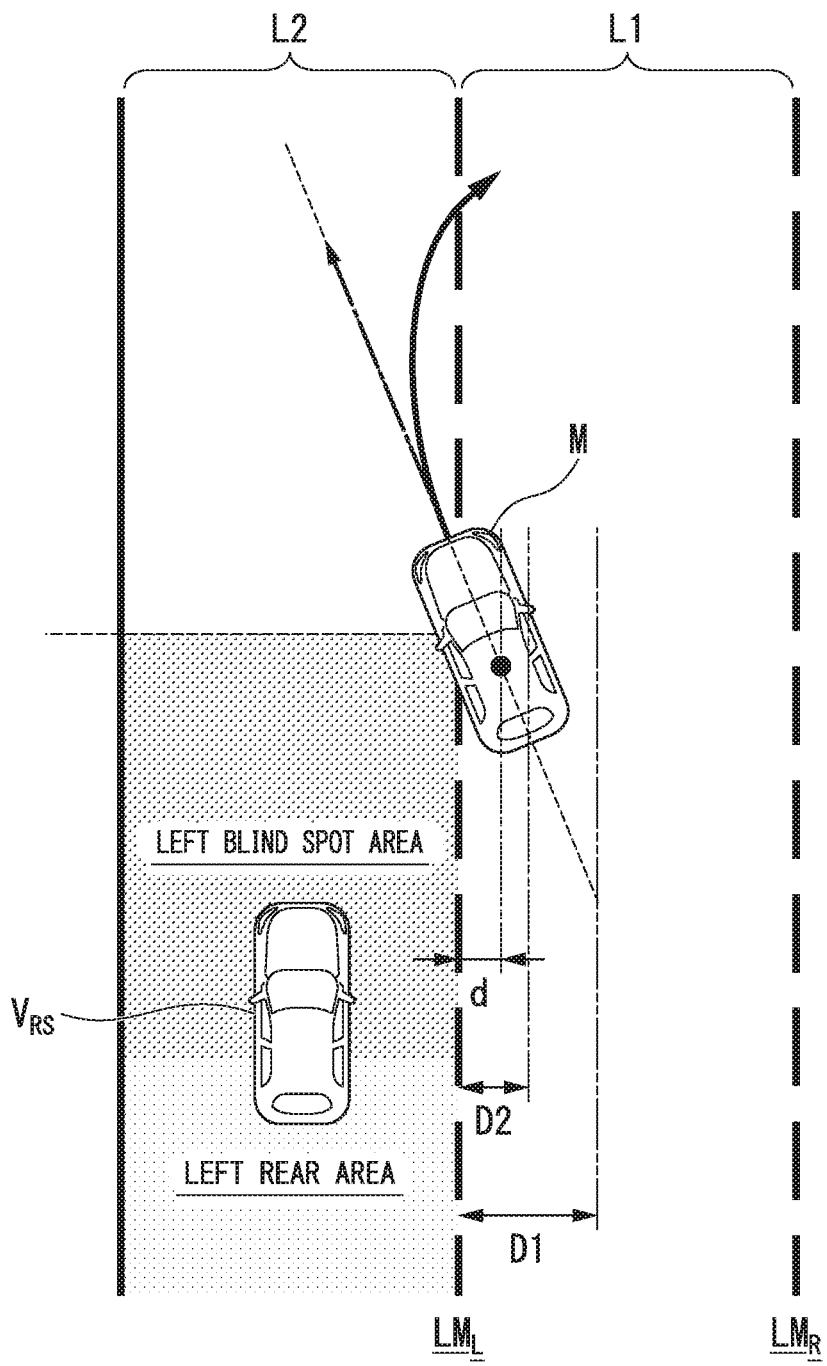
FIG. 10 is a diagram which shows another example of the scene in which lane deviation suppression control is executed.

FIG. 10 is a diagram which shows another example of the scene in which lane deviation suppression control is executed. As illustrated, when the subject vehicle M has approached the lane marking $LM_L$ until the distance d between the lane marking $LM_L$ and the subject vehicle M is equal to or less than the second distance threshold value D2, that is, when a part of the body of the subject vehicle M has crossed the lane marking $LM_L$, the lane deviation suppression control unit 116 outputs a reaction force to the steering wheel 44 by controlling the steering device 220. The reaction force is, for example, when the steering wheel 44 is operated by the driver, torque in an opposite direction to steering torque applied to a shaft (a rotation axis) of the steering wheel 44 in accordance with the operation. By outputting the reaction force to the shaft of the steering wheel 44 in this manner, the steering wheel 44 becomes difficult to turn to the left, and it is possible to suppress the subject vehicle M from entering the left adjacent lane L2 on which the adjacent vehicle $V_{RS}$ exists.

[Execution Scene Example of the Driving Support Control]

Figure 11:
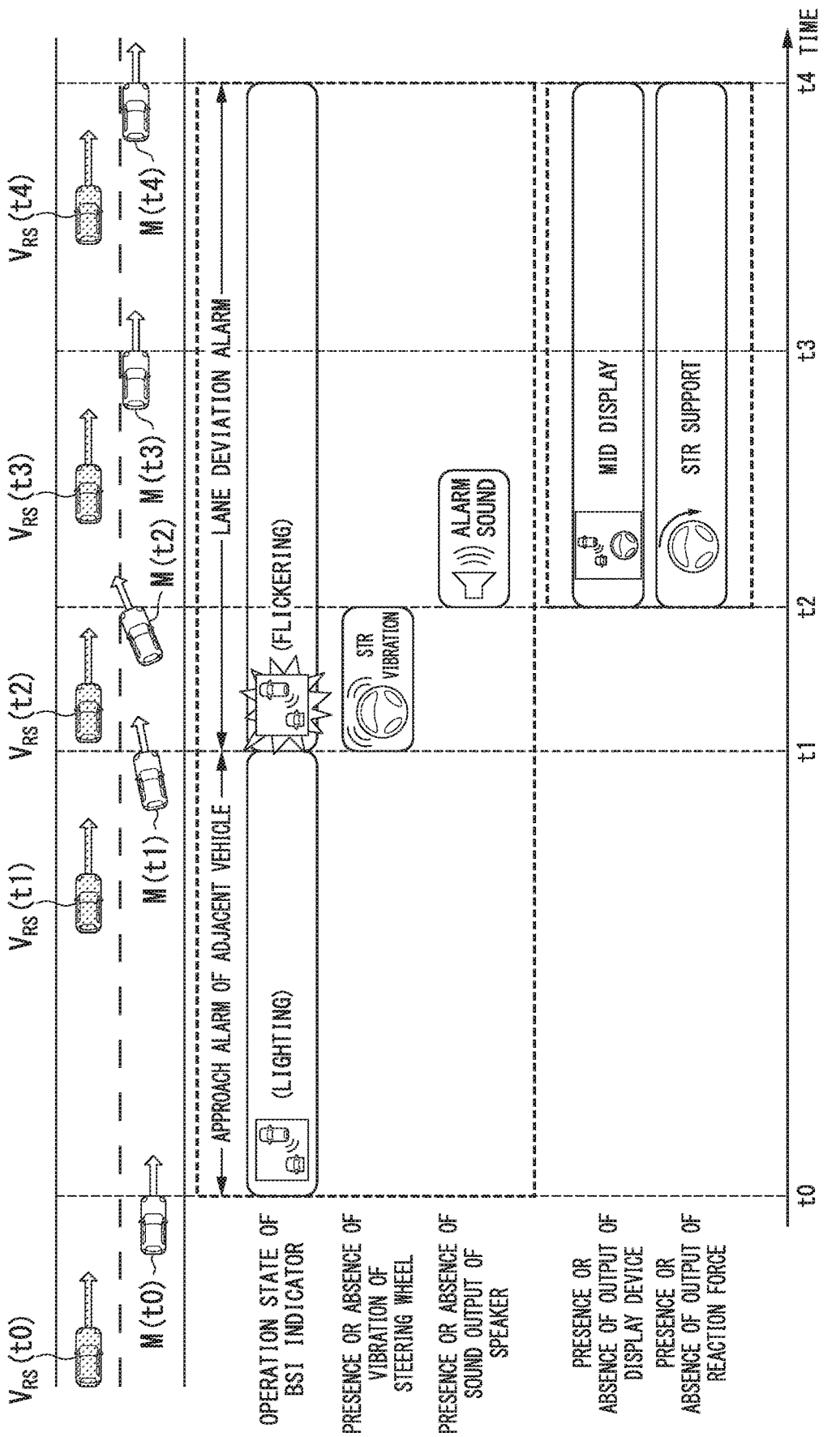
FIG. 11 is a diagram which shows control contents of driving support control together with a scene in which an adjacent vehicle approaches from a rear of the subject vehicle on an adjacent lane.

Various scenes (scenarios) in which the driving support control is executed by the driving support device 100 will be described in the following description. FIG. 11 is a diagram which shows control contents of the driving support control together with a scene in which an adjacent vehicle $V_{RS}$ approaches from the rear of the subject vehicle M on the adjacent lane.

"t0" in FIG. 11 represents a time at which the adjacent vehicle $V_{RS}$ is recognized in the blind spot area or the rear area. At the time t0, the alarm output control unit 114 causes the BSI indicator 50 to operate such that the predetermined image 50a is displayed on a part of the mirror surface of the door mirror DMR (lighting in FIG. 11). Displaying the predetermined image 50a on the mirror surface of the door mirror DMR by causing the BSI indicator 50 to operate is an example of outputting "first information."

At a time t1, a situation in which the turn signal of the subject vehicle M does not operate and the distance d is equal to or less than the first distance threshold value D1 is shown. In such a situation, the alarm output control unit 114 controls the BSI indicator 50 and causes the predetermined image 50*a* displayed on the mirror surface of the door mirror DMR to flicker ((flickering) in FIG. 11).

Since the distance d is equal to or less than the first distance threshold value D1, the lane deviation suppression control unit 116 causes the vibrator 44*a* to operate such that the steering wheel 44 is vibrated ((STR vibration) in FIG. 11). At a time t2, a situation in which the turn signal of the subject vehicle M does not operate and the distance d is equal to or less than the second distance threshold value D2 is shown. In such a situation, the alarm output control unit 114 causes the speaker 24 to output an alarm sound ((alarm sound) in FIG. 11). For example, the alarm output control unit 114 causes an alarm sound to be output from the speaker 24Lb installed on a left rear end side.

Since the distance d is equal to or less than the second distance threshold value D2, the lane deviation suppression control unit 116 causes the display device 22 to display that the subject vehicle M itself approaches the adjacent vehicle $V_{RS}$ as an image ((MID display) in FIG. 11), and outputs the reaction force to the steering wheel 44 ((STR support) in FIG. 11) as the lane deviation suppression control.

At a time t3, the subject vehicle M returns to the subject lane as a result of the lane deviation suppression control. In this case, at a time at which a predetermined time has elapsed since the subject vehicle M returns to the subject lane, or a time at which the subject vehicle M has traveled a predetermined distance (a time t4 in FIG. 11), the rear side collision suppression support control unit 110 ends the driving support control such as output control of an alarm or the lane deviation suppression control.

Figure 12:
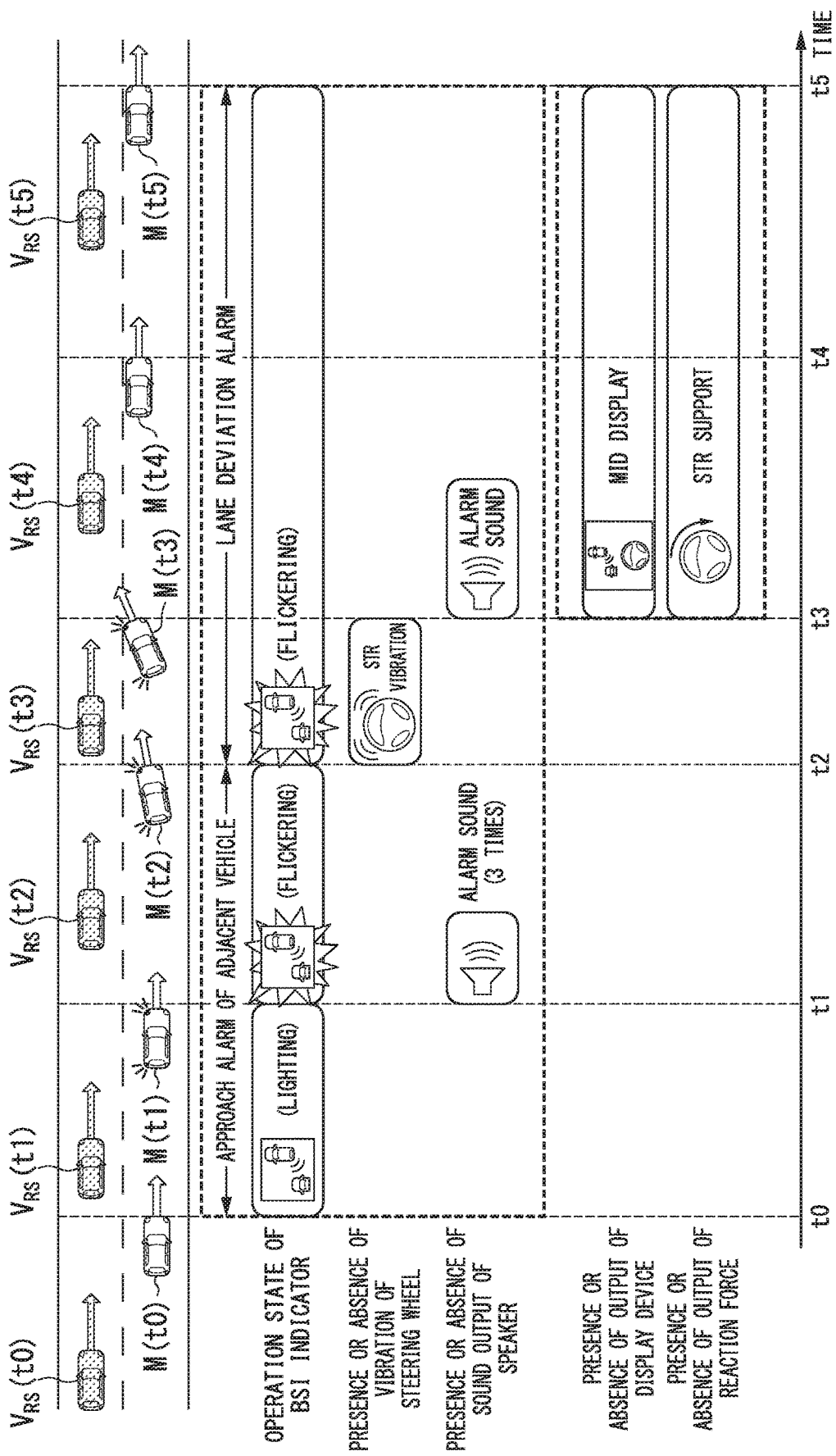
FIG. 12 is a diagram which shows the control contents of driving support control together with the scene in which an adjacent vehicle approaches from the rear of the subject vehicle on an adjacent lane.

FIG. 12 is a diagram which shows the control contents of the driving support control together with the scene in which the adjacent vehicle $V_{RS}$ approaches from the rear of the subject vehicle M on an adjacent lane. The contents of the driving support control in a state in which the adjacent vehicle $V_{RS}$ is positioned at the rear of the subject vehicle M, and the turn signal does not operate have been described in the example of FIG. 11, but the contents of the driving support control in a state in which the adjacent vehicle $V_{RS}$ is positioned at the rear of the subject vehicle M, and the turn signal operates will be described in an example of FIG. 12.

For example, a time t1 of FIG. 12 represents a time at which a turn signal on an adjacent lane side of the subject vehicle M starts to operate in a situation in which the adjacent vehicle $V_{RS}$ exists in the blind spot area or the rear area. In this case, it is assumed that the driver of the subject vehicle M instructs a lane change without recognizing the existence of the adjacent vehicle $V_{RS}$. Therefore, the alarm output control unit 114 controls the BSI indicator 50 at the time t1 and causes the predetermined image 50*a* displayed on the mirror surface of the door mirror DMR to flicker even when the subject vehicle M does not approach a lane marking ((flickering) in FIG. 12). The alarm output control unit 114 causes the speaker 24 (a speaker 24Lb installed on the left rear end side) to output an alarm sound a predetermined number of times (three times in the illustrated example) at the timing of causing the predetermined image 50*a* to flicker. As a result, it is possible to strongly prompt the driver who has instructed a lane change to pay attention as compared with before the turn signal operates. Causing the predetermined image 50*a* to flicker or causing the speaker 24 to output an alarm sound in addition thereto is an example of outputting "second information."

Figure 13:
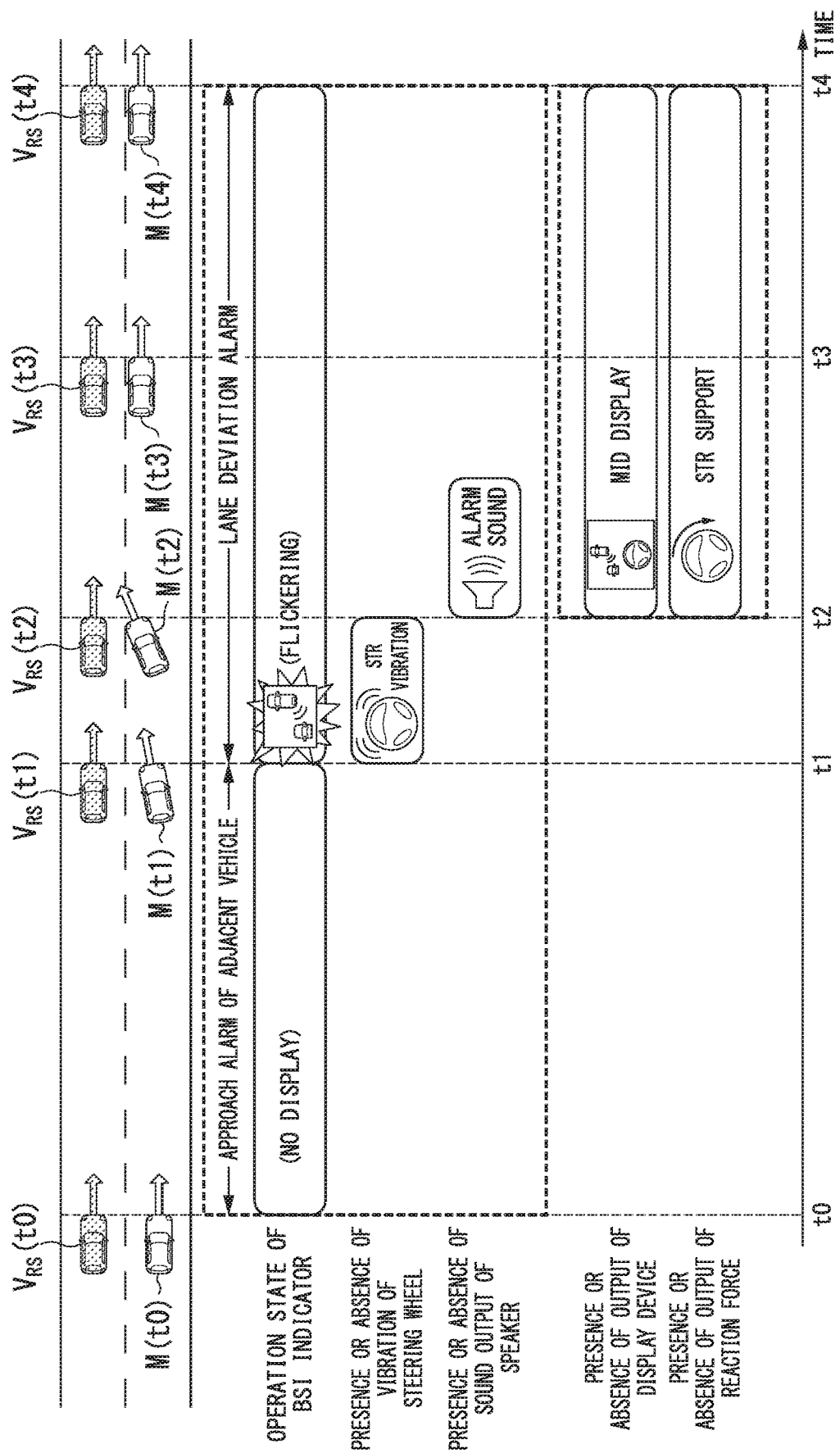
FIG. 13 is a diagram which shows the control contents of driving support control together with a scene in which an adjacent vehicle travels side-by-side on a side of the subject vehicle on an adjacent lane.

FIG. 13 is a diagram which shows the control contents of the driving support control together with a scene in which the adjacent vehicle $V_{RS}$ travels side-by-side on a side of the subject vehicle M on the adjacent lane. At a time t0, the adjacent vehicle $V_{RS}$ is recognized in the side area. In this case, the alarm output control unit 114 does not cause the predetermined image 50*a* to be displayed on the mirror surface of the door mirror DMR without causing the BSI indicator 50 to operate. In this manner, when the adjacent vehicle $V_{RS}$ exists at a position viewed from the driver of the subject vehicle M, if a lane change is not instructed, a frequency of alerting the driver is decreased. As a result, it is possible to reduce annoyance that the driver feels with respect to an alarm output.

On the other hand, as shown at a time t1, when the subject vehicle M has approached the lane marking until the distance d is equal to or less than the first distance threshold value D1 in a situation in which the turn signal of the subject vehicle M does not operate, the alarm output control unit 114 causes the BSI indicator 50 to operate, causes the predetermined image 50*a* to be displayed on the mirror surface of the door mirror DMR, and further causes the predetermined image 50*a* displayed to flicker ((flickering) in FIG. 13). At this time, the lane deviation suppression control unit 116 causes the vibrator 44*a* to operate such that the steering wheel 44 is vibrated ((STR vibration) in FIG. 13). Vibrating the steering wheel 44 is an example of outputting "third information."

Figure 14:
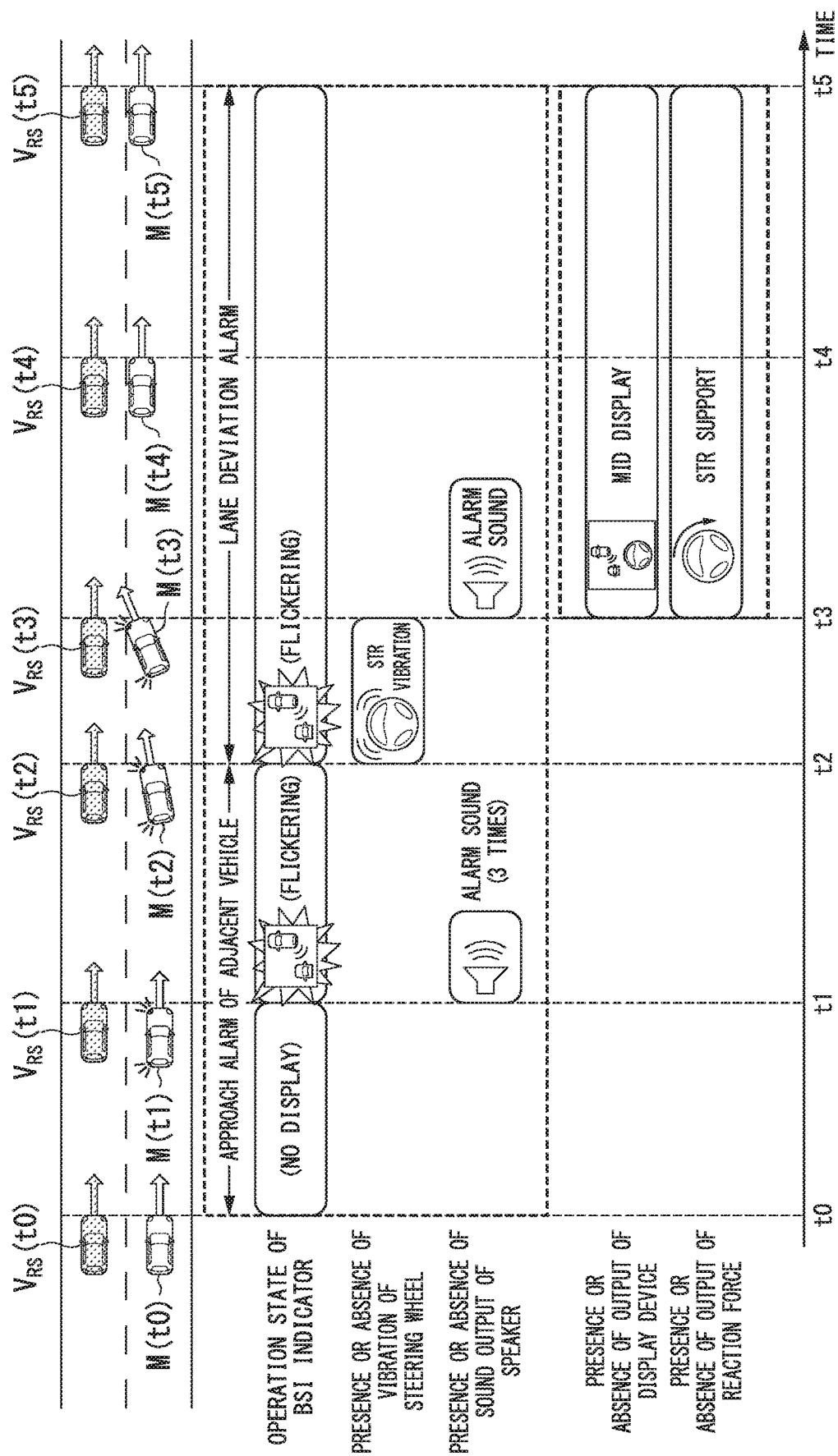
FIG. 14 is a diagram which shows the control contents of driving support control together with a scene in which an adjacent vehicle travels side-by-side on a side of the subject vehicle on an adjacent lane.

FIG. 14 is a diagram which shows the control contents of the driving support control together with a scene in which the adjacent vehicle $V_{RS}$ travels side-by-side on the side of the subject vehicle M on the adjacent lane. The contents of the driving support control in a state in which the adjacent vehicle $V_{RS}$ is positioned on the side of the subject vehicle M and the turn signal does not operate have been described in the example of FIG. 13, but the contents of the driving support control in a state in which the adjacent vehicle $V_{RS}$ is positioned on the side of the subject vehicle M and the turn signal operates will be described in an example of FIG. 14.

At a time t0, the adjacent vehicle $V_{RS}$ is recognized in the side area. Therefore, like the example of FIG. 13, the alarm output control unit 114 does not cause the predetermined image 50*a* to be displayed on the mirror surface of the door mirror DMR without causing the BSI indicator 50 to operate. On the other hand, as shown at a time t1, when the turn signal of the subject vehicle M has operated, the alarm output control unit 114 causes the BSI indicator 50 to operate, causes the predetermined image 50*a* to be displayed on the mirror surface of the door mirror DMR, and further causes the predetermined image 50*a* displayed to flicker ((flickering) in FIG. 14). The alarm output control unit 114 causes the speaker 24 (a speaker 24La installed on the left front end side) to output an alarm sound a predetermined number of times (three times in the illustrated example) at the timing of causing the predetermined image 50*a* to flicker. In this manner, even when the adjacent vehicle $V_{RS}$ exists at a position viewed from the driver of the subject vehicle M, if a lane change is instructed by the driver, the driver is prompted to pay attention. As a result, it is possible to cause the driver to recognize again that the adjacent vehicle $V_{RS}$ exists at the time of performing a lane change.

[Process Flow]

Figure 15:
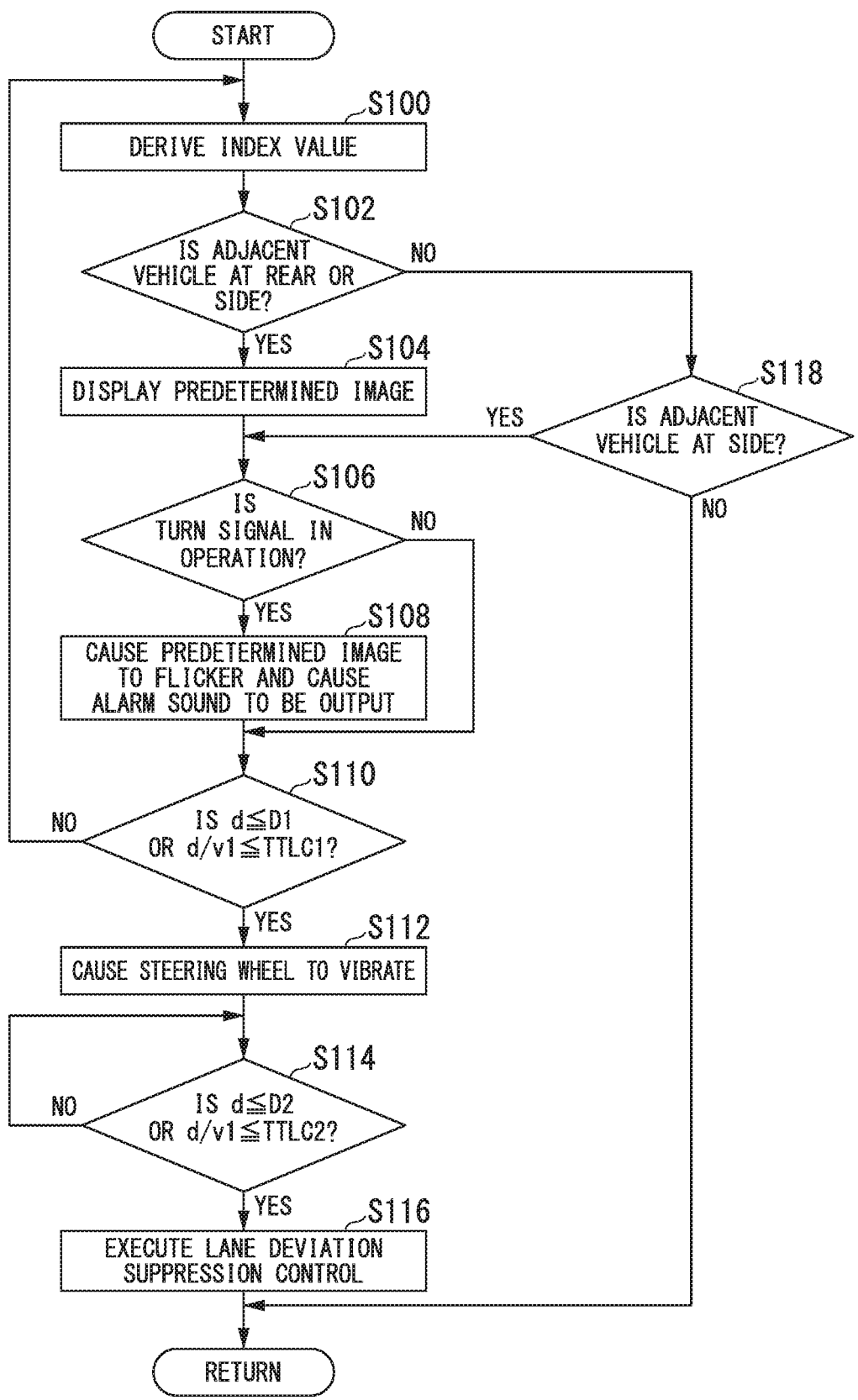
FIG. 15 is a flowchart which shows a flow of a series of processes executed by a rear side collision suppression support control unit of the first embodiment.

FIG. 15 is a flowchart which shows a flow of a series of processes executed by the rear side collision suppression support control unit 110 of the first embodiment. For example, the processes of the present flowchart may be repeatedly performed at predetermined intervals when the driving support start switch 26 is operated.

First, the index value-deriving unit 112 derives various types of index values (step S100). Next, the alarm output control unit 114 determines whether the adjacent vehicle $V_{RS}$ exists in the blind spot area or the rear area, that is, whether the adjacent vehicle $V_{RS}$ exists on a rear side of the subject vehicle M on the basis of a relative distance x between the adjacent vehicle $V_{RS}$ and the subject vehicle M which is derived by the index value-deriving unit 112 (step S102).

When it is determined that the adjacent vehicle $V_{RS}$ exists on the rear side of the subject vehicle M, the alarm output control unit 114 causes the BSI indicator 50 to operate and causes the predetermined image 50a to be displayed on the mirror surface of the door mirror DMR (step S104).

Next, the alarm output control unit 114 determines whether a turn signal on a side of the adjacent lane on which the adjacent vehicle $V_{RS}$ exists is in operation on the basis of a result of detection by the lever position detection unit 42a (step S106).

When it is determined that a turn signal on the side of the adjacent lane on which the adjacent vehicle $V_{RS}$ exists is in operation, the alarm output control unit 114 controls the BSI indicator 50 such that the predetermined image 50a displayed on the mirror surface of the door mirror DMR is caused to flicker and the speaker 24 is caused to output an alarm sound a predetermined number of times (for example, three times) or for a predetermined time (step S108).

For example, the alarm output control unit 114 causes the speaker 24Lb installed on the left rear end side of a vehicle compartment interior to output an alarm sound when the adjacent vehicle $V_{RS}$ exists on the rear side of the left adjacent lane, causes the speaker 24La installed on the left front end side of the vehicle compartment interior to output an alarm sound when the adjacent vehicle $V_{RS}$ exists on the side of the left adjacent lane, causes the speaker 24Rb installed on the right rear end side of the vehicle compartment interior to output an alarm sound when the adjacent vehicle $V_{RS}$ exists on the side of the right adjacent lane, and causes the speaker 24Ra installed on the right front end side of the vehicle compartment interior to output an alarm sound when the adjacent vehicle $V_{RS}$ exists on the side of the right adjacent lane. As a result, it is possible to cause the driver to physically recognize in which direction a vehicle to which attention needs to be directed exists.

When it is determined that a turn signal on the side of the adjacent lane on which the adjacent vehicle $V_{RS}$ exists is not in operation, the alarm output control unit 114 omits the process of step S108 and shifts the process to step S110 to be described below.

Next, the lane deviation suppression control unit 116 determines whether the distance d derived by the index value-deriving unit 112 is equal to or less than the first distance threshold value D1, or whether the estimated lane deviation time TTLC obtained by dividing the distance d by the lateral speed v1 of the subject vehicle M (=d/v1) is equal to or less than the first time threshold value TTLC1 (step S110). When it is determined that the distance d exceeds the first distance threshold value D1 or when it is determined that the estimated lane deviation time TTLC (=d/v1) exceeds the first time threshold value TTLC1, the lane deviation suppression control unit 116 shifts the process to step S100.

On the other hand, when it is determined that the distance d is equal to or less than the first distance threshold value D1 or when it is determined that the estimated lane deviation time TTLC (=d/v1) is equal to or less than the first time threshold value TTLC1, the lane deviation suppression control unit 116 causes the vibrator 44a to operate such that the steering wheel 44 is vibrated (step S112). At this time, the alarm output control unit 114 causes the BSI indicator 50 to operate, causes the predetermined image 50a to be displayed on the mirror surface of the door mirror DMR, and further causes the image to flicker when the predetermined image 50a has not been displayed on the mirror surface of the door mirror DMR yet (in the case of obtaining a positive determination result in the process of step S118 to be described below).

Next, the lane deviation suppression control unit 116 waits until the distance d is equal to or less than the second distance threshold value D2 or until the estimated lane deviation time TTLC (=d/v1) is equal to or less than the second time threshold value TTLC2 (step S114), and executes lane deviation suppression control when the distance d is equal to or less than the second distance threshold value D2 or when the estimated lane deviation time TTLC (=d/v1) is equal to or less than the second time threshold value TTLC2 (step S116). For example, the lane deviation suppression control unit 116, as lane deviation suppression control, outputs a reaction force to the steering wheel 44, and causes the display device 22 of the HMI 20 to display an image or causes the speaker 24 to output an alarm sound. Accordingly, the processes of the present flowchart end.

On the other hand, in the process of step S102, the alarm output control unit 114 further determines whether the adjacent vehicle $V_{RS}$ exists in the side area, that is, whether the adjacent vehicle $V_{RS}$ exists on the side of the subject vehicle M when it is determined that the adjacent vehicle $V_{RS}$ does not exist on the rear side of the subject vehicle M (step S118).

When it is determined that the adjacent vehicle $V_{RS}$ exists on the side of the subject vehicle M, the alarm output control unit 114 shifts the process to step S106 described above.

On the other hand, when it is determined that the adjacent vehicle $V_{RS}$ does not exist on either the rear side or the side of the subject vehicle M, that is, when the adjacent vehicle $V_{RS}$ does not exist in the monitoring area R, the rear side collision suppression support control unit 110 ends the processes of the present flowchart.

According to the first embodiment described above, surrounding vehicles existing around the subject vehicle M are recognized, and one or a plurality of control modes such as causing the BSI indicator 50 to be lit or to flicker, causing the steering wheel 44 to vibrate, causing the speaker 24 to output an alarm sound, and controlling the steering of the subject vehicle M such that the subject vehicle M does not deviate from the traveling lane by controlling the steering device 220 are adopted on the basis of a position of the adjacent vehicle $V_{RS}$ existing on an adjacent lane adjacent to the subject lane on which the subject vehicle M exists among the recognized surrounding vehicles, and thus it is possible to perform control on in-vehicle devices in a more appropriate mode.

According to the first embodiment described above, since an alarm sound is output while causing the steering wheel 44 to vibrate, it is possible to create a situation in which the subject vehicle M travels over rumble strips and it is possible to more strongly prompt the driver to pay attention.

Second Embodiment

Hereinafter, a second embodiment will be described. The second embodiment is different from the first embodiment described above in that, when the adjacent vehicle $V_{RS}$ exists in the side area, a seat on which the driver is seated is caused to vibrate or the subject vehicle M is decelerated, and thereby the driver is alerted regardless of whether the turn signal operates. Hereinafter, differences from the first embodiment will be mainly described, and descriptions of functions and the like in common with the first embodiment will be omitted.

Figure 16:
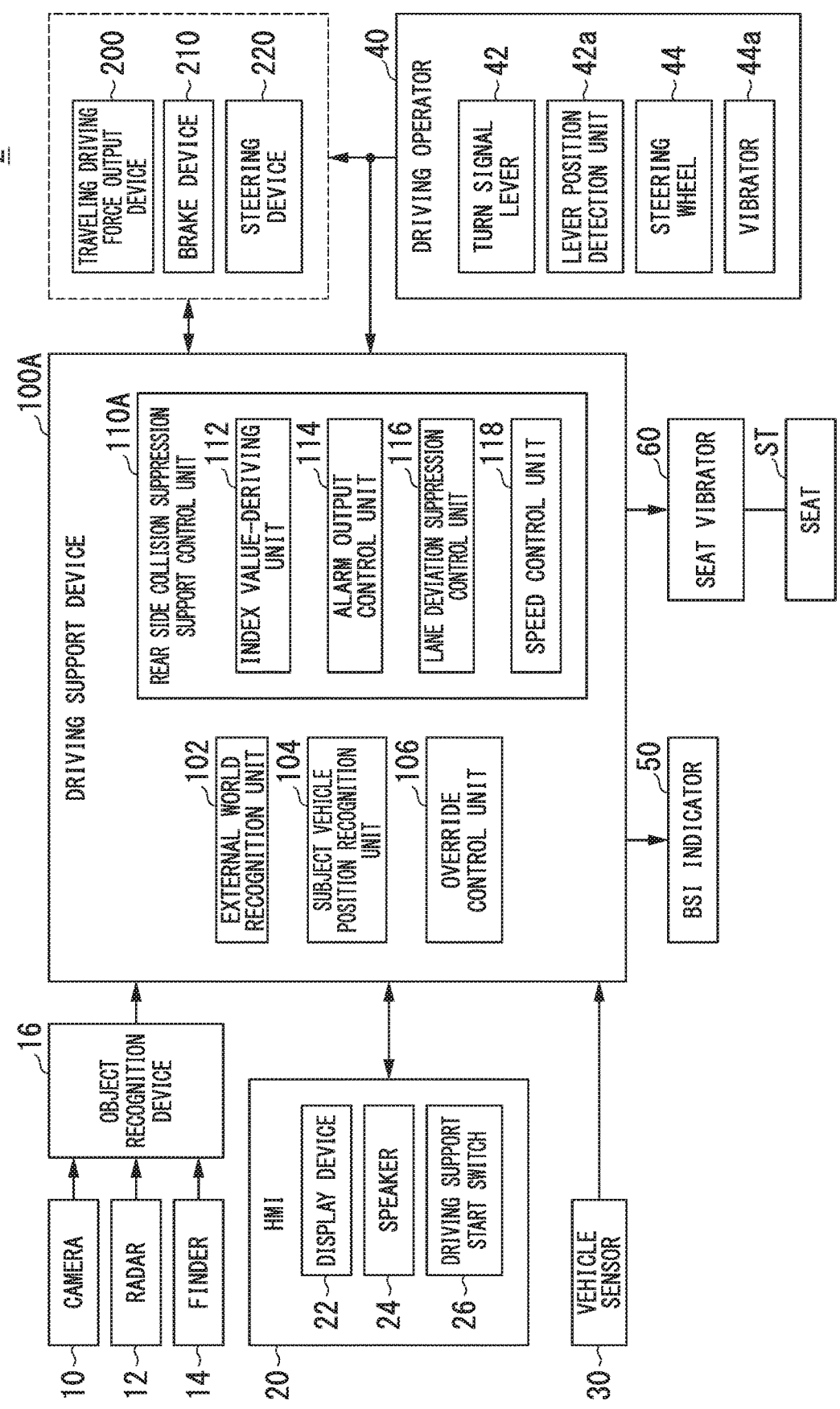
FIG. 16 is a configuration diagram of a vehicle control system including a driving support device of a second embodiment.

FIG. 16 is a configuration diagram of a vehicle control system 2 including a driving support device 100A of the second embodiment. The vehicle control system 2 includes, for example, a camera 10, a radar 12, a finder 14, an object recognition device 16, an HMI 20, a vehicle sensor 30, a driving operator 40, a BSI indicator 50, a seat vibrator 60 for causing a seat ST to vibrate, a driving support device 100A, a traveling driving force output device 200, a brake device 210, and a steering device 220. These devices or apparatuses are connected to each other by a multiplex communication line such as a CAN communication line, a serial communication line, a wireless communication network, and the like. The configuration shown in FIG. 16 is merely an example, and a part of the configuration may be omitted or another configuration may also be further added.

The seat vibrator 60 is installed, for example, inside the seat ST of the driver's seat and causes a part of the back of the seat ST to vibrate. More specifically, the seat vibrator 60 causes a portion in contact with the shoulder of a driver to vibrate when the driver is seated on the seat ST. A combination of the HMI 20, the steering wheel 44 and the vibrator 44a, the seat ST and the seat vibrator 60, and the alarm output control unit 114 is another example of an "output unit."

The rear side collision suppression support control unit 110A of the driving support device 100A in the second embodiment further includes a speed control unit (speed controller) '118 in addition to the index value-deriving unit 112 described above, the alarm output control unit 114, and the lane deviation suppression control unit 116.

The alarm output control unit 114 in the second embodiment causes the seat vibrator 60 to operate such that the seat ST is vibrated when the distance d derived by the index value-deriving unit 112 is equal to or less than the third distance threshold value D3 or when the estimated lane deviation time TTLC obtained by dividing the distance d by the lateral speed v1 of the subject vehicle M (=d/v1) is equal to or less than the third time threshold value TTLC3 in a situation in which the adjacent vehicle $V_{RS}$ exists on the side of the subject vehicle M. The third distance threshold value D3 is set to a value larger than at least the second distance threshold value D2. The third time threshold value TTLC3 is set to a value larger than at least the second time threshold value TTLC2.

The speed control unit 118 controls the speed of the subject vehicle M by controlling the traveling driving force output device 200 and the brake device 210. For example, when the distance d derived by the index value-deriving unit 112 is equal to or less than the third distance threshold value D3 or when the estimated lane deviation time TTLC obtained by dividing the distance d by the lateral speed v1 of the subject vehicle M (=d/v1) is equal to or less than the third time threshold value TTLC3 in a situation in which the adjacent vehicle $V_{RS}$ exists on the side of the subject vehicle M, the speed control unit 118 decelerates the subject vehicle M at a reduced speed to the extent that the driver notices (corresponding to a reduced speed when lightly pressing the brake pedal) by controlling the traveling driving force output device 200 and the brake device 210.

When the distance d derived by the index value-deriving unit 112 is equal to or less than the third distance threshold value D3 or when the estimated lane deviation time TTLC obtained by dividing the distance d by the lateral speed v1 of the subject vehicle M (=d/v1) is equal to or less than the third time threshold value TTLC3 in a situation in which the adjacent vehicle $V_{RS}$ exists on the side of the subject vehicle M, the speed control unit 118 may also control the speed of the subject vehicle M such that an inter-vehicle distance between the adjacent vehicle $V_{RS}$ and the subject vehicle M becomes a predetermined distance.

[Process Flow]

Figure 17:
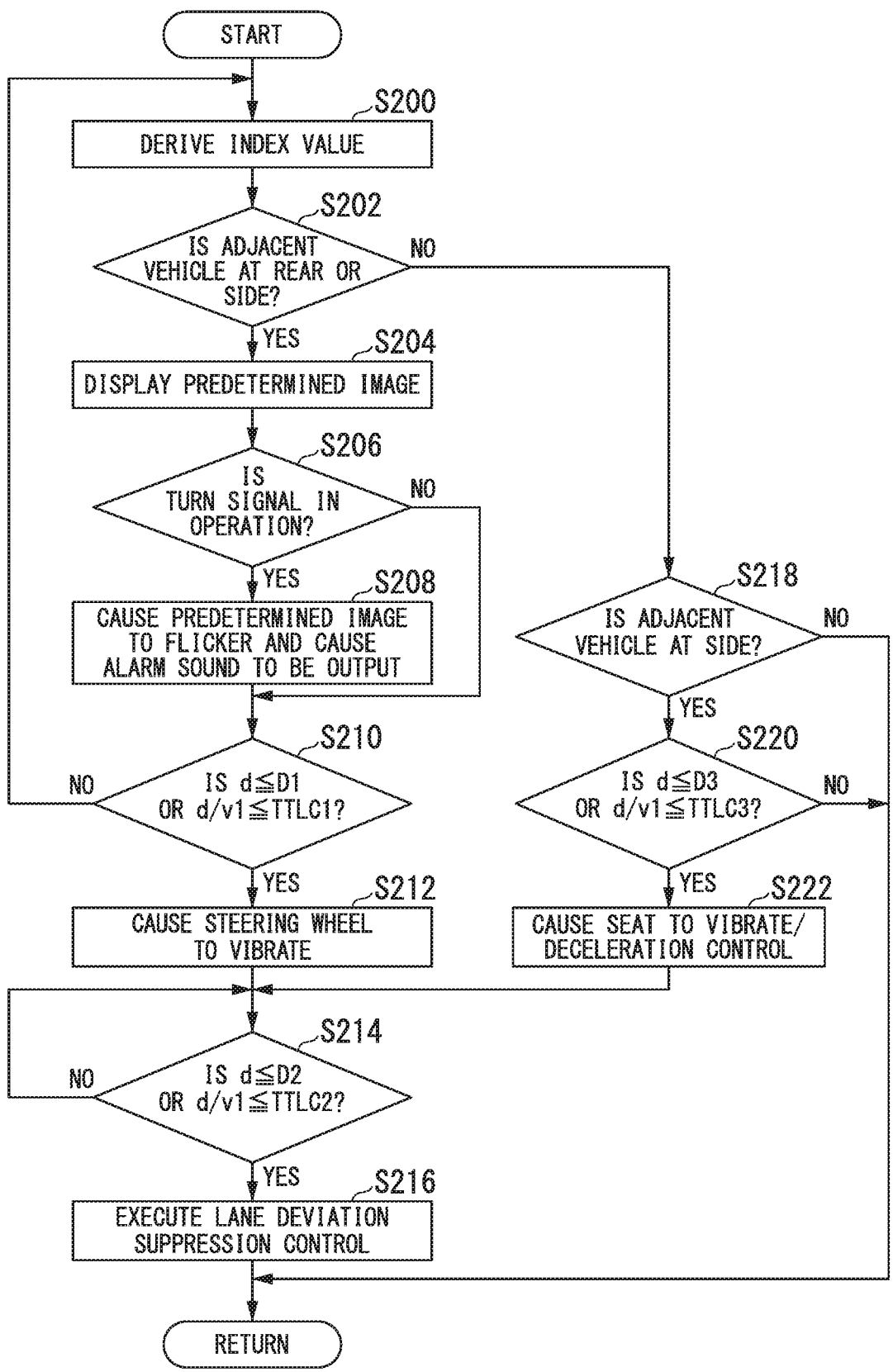
FIG. 17 is a flowchart which shows a flow of a series of processes executed by a rear side collision suppression support control unit of the second embodiment.

FIG. 17 is a flowchart which shows a flow of a series of processes executed by the rear side collision suppression support control unit 110A of the second embodiment. For example, the processes of the present flowchart may be repeatedly performed at predetermined intervals when the driving support start switch 26 is operated.

First, the index value-deriving unit 112 derives various types of index values (step S200). Next, the alarm output control unit 114 determines whether the adjacent vehicle $V_{RS}$ exists in the blind spot area or the rear area, that is, whether the adjacent vehicle $V_{RS}$ exists on the rear side of the subject vehicle M on the basis of a relative distance x between the adjacent vehicle $V_{RS}$ and the subject vehicle M which is derived by the index value-deriving unit 112 (step S202).

When it is determined that the adjacent vehicle $V_{RS}$ exists on the rear side of the subject vehicle M, the alarm output control unit 114 causes the BSI indicator 50 to operate and causes the predetermined image 50a to be displayed on the mirror surface of the door mirror DMR (step S204).

Next, the alarm output control unit 114 determines whether a turn signal on the side of the adjacent lane on which the adjacent vehicle VRS exists is in operation on the basis of a result of detection by the lever position detection unit 42a (step S206).

When it is determined that a turn signal on the side of the adjacent lane on which the adjacent vehicle $V_{RS}$ exists is in operation, the alarm output control unit 114 controls the BSI indicator 50 such that the predetermined image 50a displayed on the mirror surface of the door mirror DMR is caused to flicker and the speaker 24 is caused to output an alarm sound a predetermined number of times (for example, three times) or for a predetermined time (step S208).

On the other hand, when it is determined that a turn signal on the side of the adjacent lane on which the adjacent vehicle $V_{RS}$ exists is not in operation, the alarm output control unit 114 omits the process of step S208 and shifts the process to step S210 to be described below.

Next, the lane deviation suppression control unit 116 determines whether the distance d derived by the index value-deriving unit 112 is equal to or less than the first distance threshold value D1, or whether the estimated lane deviation time TTLC obtained by dividing the distance d by the lateral speed v1 of the subject vehicle M (=d/v1) is equal to or less than the time threshold value TTLC1 (step S210). When it is determined that the distance d exceeds the first distance threshold value D1 or when it is determined that the estimated lane deviation time TTLC (=d/v1) exceeds the time threshold value TTLC1, the lane deviation suppression control unit 116 shifts the process to step S200.

On the other hand, when it is determined that the distance d is equal to or less than the first distance threshold value D1 or when it is determined that the estimated lane deviation time TTLC (=d/v1) is equal to or less than the time threshold value TTLC1, the lane deviation suppression control unit 116 causes the vibrator 44a to operate such that the steering wheel 44 is vibrated (step S212).

Next, the lane deviation suppression control unit 116 waits until the distance d is equal to or less than the second distance threshold value D2 or until the estimated lane deviation time TTLC (=d/v1) is equal to or less than the second time threshold value TTLC2 (step S214), and executes lane deviation suppression control when the distance d is equal to or less than the second distance threshold value D2 or when the estimated lane deviation time TTLC (=d/v1) is equal to or less than the second time threshold value TTLC2 (step 216).

On the other hand, in the process of step S202, the alarm output control unit 114 further determines whether the adjacent vehicle $V_{RS}$ exists in the side area, that is, whether the adjacent vehicle $V_{RS}$ exists on the side of the subject vehicle M when it is determined that the adjacent vehicle $V_{RS}$ does not exist on the rear side of the subject vehicle M (step S218).

When it is determined that the adjacent vehicle $V_{RS}$ exists on the side of the subject vehicle M, the alarm output control unit 114 determines whether the distance d derived by the index value-deriving unit 112 is equal to or less than the third distance threshold value D3 or whether the estimated lane deviation time TTLC obtained by dividing the distance d by the lateral speed v1 of the subject vehicle M (=d/v1) is equal to or less than the third time threshold value TTLC3 (step S220).

On the other hand, when it is determined that the adjacent vehicle $V_{RS}$ exists on neither the rear side nor the side of the subject vehicle M, that is, when the adjacent vehicle $V_{RS}$ does not exist in the monitoring area R, or when the distance d exceeds the third distance threshold value D3 or the estimated lane deviation time TTLC (=d/v1) exceeds the third time threshold value TTLC3, the processes of the present flowchart end.

On the other hand, when the distance d is equal to or less than the third distance threshold value D3 or when the estimated lane deviation time TTLC (=d/v1) is equal to or less than the third time threshold value TTLC3, the alarm output control unit 114 causes the seat vibrator 60 to operate such that the seat ST is vibrated (step S222). At this time, the speed control unit 118 may decelerate the subject vehicle M instead of or in addition to causing the seat ST to vibrate.

The speed control unit 118 may also control the speed of the subject vehicle M such that an inter-vehicle distance between the adjacent vehicle $V_{RS}$ existing on the side and the subject vehicle M becomes a predetermined distance during the processing of step S222. The rear side collision suppression support control unit 110A proceeds with the process to step S214 after the process of step S222 is performed.

According to the second embodiment described above, surrounding vehicles existing around the subject vehicle M are recognized, and one or a plurality of modes such as causing the BSI indicator 50 to be lit or to flicker, causing the steering wheel 44 to vibrate, causing the speaker 24 to output an alarm sound, causing the seat ST on which the driver is seated to vibrate, causing the subject vehicle M to decelerate, and controlling the steering of the subject vehicle M such that the subject vehicle M does not deviate from the traveling lane by controlling the steering device 220 are adopted on the basis of a position of the adjacent vehicle $V_{RS}$ existing on the adjacent lane adjacent to the subject lane on which the subject vehicle M exists among the recognized surrounding vehicles, and thus it is possible to perform control on in-vehicle devices in a more appropriate mode.

According to the second embodiment described above, like the first embodiment described above, since an alarm sound is output while the steering wheel 44 and the seat ST are vibrated, a situation in which the subject vehicle M travels over rumble strips can be created and it is possible to more strongly prompt the driver to pay attention.

According to the second embodiment described above, when the adjacent vehicle $V_{RS}$ exists on the side of the subject vehicle M, if the distance d between the subject vehicle M and the lane marking is equal to or less than the third distance threshold value D3 or if the estimated lane deviation time TTLC (=d/v1) is equal to or less than the third time threshold value TTLC3, it is possible to cause the driver to intuitively notice that a vehicle to which attention needs to be directed exists further forward than the side of the subject vehicle to decelerate the subject vehicle M.

According to the second embodiment described above, when the distance d is equal to or less than the third distance threshold value D3 or when the estimated lane deviation time TTLC (=d/v1) is equal to or less than the third time threshold value TTLC3 in a situation in which the adjacent vehicle $V_{RS}$ exists on the side of the subject vehicle M, since the speed of the subject vehicle M is controlled such that the inter-vehicle distance between the adjacent vehicle $V_{RS}$ and the subject vehicle M becomes a predetermined distance, it is possible to entrust the driving support device 100A with an inter-vehicle adjustment and the driver can easily perform a lane change.

The embodiments described above can be expressed as follows.

A driving support device is configured to include
an output unit configured to output information,
a storage configured to store a program, and
a processor,
in which the processor, by executing the program,
recognizes surrounding vehicles existing around a subject vehicle, and
determines control modes of in-vehicle devices of the subject vehicle including the output unit on the basis of a position of a surrounding vehicle existing on an adjacent lane adjacent to a subject lane on which the subject vehicle exists among the recognized one or more surrounding vehicles.

As described above, modes for carrying out the present invention have been described using the embodiments, but the present invention is not limited to these embodiments, and various modifications and substitutions can be added within a range not deviating from the gist of the present invention.

What is claimed is:

1. A driving support device, comprising:
a processor; and
a memory that stores program instructions executable by the processor to:
output information;
recognize surrounding vehicles existing around a subject vehicle; and
determine control modes of in-vehicle devices of the subject vehicle based on a position of a surrounding vehicle existing on an adjacent lane adjacent to a subject lane on which the subject vehicle exists among one or more surrounding vehicles of the surrounding vehicles,
wherein the processor acquires information indicating an operation state of a direction indicator,
wherein the processor outputs first information regardless of the operation state of the direction indicator when the surrounding vehicle existing on the adjacent lane is in a first positional relationship of being positioned on a rear side of the subject vehicle, the first information being an information that prompts a driver of the subject vehicle to pay attention, wherein the processor does not output the first information when the surrounding vehicle existing on the adjacent lane is in a second positional relationship of being positioned on a side of the subject vehicle, the side of the subject vehicle being a position closer to the subject vehicle than the rear side of the subject vehicle with respect to a direction of travel of the vehicle, wherein the side of the subject vehicle is determined based on a lateral distance as measured from a front bumper of the subject vehicle to a side mirror of the subject vehicle, and wherein the processor outputs second information when the surrounding vehicle existing on the adjacent lane is in the second positional relationship of being positioned on the side of the subject vehicle and the direction indicator operates, the second information being an information that prompts the driver to pay attention and a type of the second information is different from a type of the first information.

2. The driving support device according to claim 1, wherein the processor further recognizes a lane marking which partitions between the subject lane and the adjacent lane, outputs information regardless of a distance between the lane marking and the subject vehicle when the surrounding vehicle existing on the adjacent lane is in the first positional relationship of being positioned on the rear side of the subject vehicle, and outputs information when the surrounding vehicle existing on the adjacent lane is in the second positional relationship of being positioned on the side of the subject vehicle and the distance between the lane marking and the subject vehicle is equal to or less than a predetermined distance.

3. The driving support device according to claim 2, wherein the processor outputs first information that prompts a driver of the subject vehicle to pay attention when the surrounding vehicle existing on the adjacent lane is in the first positional relationship with respect to the subject vehicle, and outputs second information that prompts the driver to pay more attention than the first information when the surrounding vehicle existing on the adjacent lane is in the second positional relationship with respect to the subject vehicle and the distance between the lane marking and the subject vehicle is equal to or less than the predetermined distance.

4. The driving support device according to claim 1, wherein the processor further recognizes a lane marking which partitions between the subject lane and the adjacent lane, acquires information indicating the operation state of the direction indicator, outputs first information regardless of the operation state of the direction indicator and a distance between the lane marking and the subject vehicle when the surrounding vehicle existing on the adjacent lane is in the first positional relationship of being positioned on the rear side of the subject vehicle, outputs second information when the direction indicator operates, outputs third information when the distance between the lane marking and the subject vehicle is equal to or less than a first predetermined distance, and when the distance between the lane marking and the subject vehicle is equal to or less than a second predetermined distance that is shorter than the first predetermined distance, controls steering of the subject vehicle such that the subject vehicle is kept away from the lane marking.

5. The driving support device according to claim 1, wherein the processor further recognizes a lane marking which partitions between the subject lane and the adjacent lane, acquires information indicating the operation state of the direction indicator, outputs first information regardless of the operation state of the direction indicator and a distance between the lane marking and the subject vehicle when the surrounding vehicle existing on the adjacent lane is in the first positional relationship of being positioned on the rear side of the subject vehicle, outputs second information when the direction indicator operates, outputs third information when the distance between the lane marking and the subject vehicle is equal to or less than a predetermined distance, and controls steering of the subject vehicle such that the subject vehicle is kept away from the lane marking when a predetermined time has elapsed since the processor has output the third information.

6. A driving support method, comprising:

by an in-vehicle computer, comprising a processor, mounted on a subject vehicle outputting information, recognizing surrounding vehicles existing around the subject vehicle, determining control modes of in-vehicle devices of the subject vehicle based on a position of a surrounding vehicle existing on an adjacent lane adjacent to a subject lane on which the subject vehicle exists among one or more surrounding vehicles of the surrounding vehicles, acquiring information indicating an operation state of a direction indicator, outputting first information regardless of the operation state of the direction indicator when the surrounding vehicle existing on the adjacent lane is in a first positional relationship of being positioned on a rear side of the subject vehicle, the first information being an information that prompts a driver of the subject vehicle to pay attention, not outputting the first information when the surrounding vehicle existing on the adjacent lane is in a second positional relationship of being positioned on a side of the subject vehicle, the side of the subject vehicle being a position closer to the subject vehicle than the rear side of the subject vehicle with respect to a direction of travel of the subject vehicle, wherein the side of the subject vehicle is determined based on a lateral distance as measured from a front bumper of the subject vehicle to a side mirror of the subject vehicle, and outputting second information when the surrounding vehicle existing on the adjacent lane is in the second positional relationship of being positioned on the side of the subject vehicle and the direction indicator operates, the second information being information that prompts the driver to pay attention and a type of the second information being different from a type of the first information.

\* \* \* \* \*